US012598609B2

(12) United States Patent
Wang et al.

(10) Patent No.: US 12,598,609 B2
(45) Date of Patent: Apr. 7, 2026

(54) TRANSMISSION METHOD, APPARATUS, FIRST COMMUNICATION NODE, SECOND COMMUNICATION NODE, AND MEDIUM

(71) Applicant: ZTE Corporation, Guangdong (CN)

(72) Inventors: Yuxin Wang, Shenzhen (CN); Yu Ngok Li, Shenzhen (CN); Zhaohua Lu, Shenzhen (CN); Chuangxin Jiang, Shenzhen (CN); Hao Wu, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 489 days.

(21) Appl. No.: 17/721,733

(22) Filed: Apr. 15, 2022

(65) Prior Publication Data

US 2022/0330300 A1 Oct. 13, 2022

Related U.S. Application Data

(63) Continuation of application No. PCT/CN2020/120657, filed on Oct. 13, 2020.

(30) Foreign Application Priority Data

Oct. 15, 2019 (CN) .......................... 201910980440.0

(51) Int. Cl.
*H04W 72/1273* (2023.01)
*H04L 5/00* (2006.01)
(Continued)

(52) U.S. Cl.
CPC ....... *H04W 72/1273* (2013.01); *H04L 5/0051* (2013.01); *H04W 72/0446* (2013.01); *H04W 72/23* (2023.01)

(58) Field of Classification Search
CPC ......... H04W 72/1273; H04W 72/0446; H04W 72/23; H04W 72/20; H04L 5/0051;
(Continued)

(56) References Cited

U.S. PATENT DOCUMENTS

| | | | |
|---|---|---|---|
| 11,838,232 B2 * | 12/2023 | Manolakos | ........... H04L 5/0082 |
| 2010/0167657 A1 * | 7/2010 | Molnar | ................. H04W 24/10 455/67.11 |

(Continued)

FOREIGN PATENT DOCUMENTS

| | | |
|---|---|---|
| CN | 102934500 A | 2/2013 |
| CN | 104471994 A | 3/2015 |

(Continued)

OTHER PUBLICATIONS

Rejection for Chinese corresponding application No. 202211263261.3 dated Dec. 14, 2023, 4p.

(Continued)

*Primary Examiner* — Thuong Nguyen
(74) *Attorney, Agent, or Firm* — Crowell & Moring LLP

(57) ABSTRACT

Provided are a transmission method and apparatus, a first communication node, a second communication node, and a medium. In the method, indication information is sent, where the indication information is used for indicating that a second communication node sends an uplink signal or receives a downlink signal; and signal transmission with the second communication node is performed according to the indication information.

8 Claims, 3 Drawing Sheets

Send indication information, where the indication information is used for indicating that a second communication node sends an uplink signal or receives a downlink signal ⟩ 110

Perform signal transmission with the second communication node according to the indication information ⟩ 120

(51) Int. Cl.
  *H04W 72/0446* (2023.01)
  *H04W 72/23* (2023.01)
(58) Field of Classification Search
  CPC .............. H04L 5/0078; H04L 5/0094; H04L 27/26025; H04L 27/2613; H04L 5/0023; H04L 5/0048; H04L 5/0053
  USPC ........................................................ 370/342
  See application file for complete search history.

(56) References Cited

U.S. PATENT DOCUMENTS

| | | | | |
|---|---|---|---|---|
| 2010/0189074 A1* | 7/2010 | Liao | .................. | H04W 36/0011 |
| | | | | 370/331 |
| 2013/0121279 A1 | 5/2013 | Noh et al. | | |
| 2013/0286994 A1* | 10/2013 | Liu | ...................... | H04W 28/18 |
| | | | | 370/329 |
| 2015/0223180 A1 | 8/2015 | Noh | | |
| 2016/0277065 A1* | 9/2016 | Xie | ...................... | H04B 1/7143 |
| 2018/0019843 A1* | 1/2018 | Papasakellariou | .... | H04L 5/0091 |
| 2019/0036671 A1* | 1/2019 | Lee | ...................... | H04W 72/04 |
| 2019/0254061 A1 | 8/2019 | Mauolakos et al. | | |
| 2019/0349123 A1* | 11/2019 | Virtanen | .............. | H04L 1/0026 |
| 2020/0036425 A1 | 1/2020 | Ren et al. | | |
| 2020/0137701 A1* | 4/2020 | Harada | ................. | H04L 5/0053 |
| 2020/0275431 A1* | 8/2020 | Bae | ...................... | H04W 72/04 |
| 2020/0367238 A1* | 11/2020 | Guan | ............... | H04W 72/0446 |
| 2021/0037406 A1* | 2/2021 | Takeda | .................. | H04L 5/0057 |
| 2021/0105102 A1* | 4/2021 | Li | ........................ | H04L 1/1896 |
| 2021/0105761 A1* | 4/2021 | Cheng | .................. | H04L 5/0053 |
| 2021/0185672 A1* | 6/2021 | Wang | ............... | H04W 72/0446 |
| 2021/0297193 A1* | 9/2021 | Noh | ...................... | H04L 1/1861 |
| 2021/0298029 A1* | 9/2021 | Liu | ................... | H04W 72/0453 |
| 2021/0409178 A1* | 12/2021 | Faxér | ................... | H04L 5/0053 |
| 2022/0022176 A1* | 1/2022 | Chen | ............... | H04W 52/0229 |
| 2022/0225399 A1* | 7/2022 | Manolakos | .......... | H04L 5/0048 |
| 2022/0278881 A1* | 9/2022 | Munier | ............... | H04L 5/0023 |
| 2022/0330293 A1* | 10/2022 | Matsumura | ......... | H04W 72/23 |
| 2022/0330300 A1* | 10/2022 | Wang | ................... | H04W 72/20 |

FOREIGN PATENT DOCUMENTS

| | | | |
|---|---|---|---|
| CN | 108260217 A | 7/2018 | |
| CN | 108282879 A | 7/2018 | |
| CN | 108631831 A | 10/2018 | |
| CN | 110324124 A | 10/2019 | |
| CN | 110650001 A | 1/2020 | |
| EP | 3 457 801 A1 | 3/2019 | |
| EP | 3 480 968 A1 | 5/2019 | |
| JP | 2019-514268 A | 5/2019 | |
| WO | WO 2019/140666 A1 | 7/2018 | |
| WO | WO 2019/170089 A1 | 9/2019 | |
| WO | WO 2021/073508 A1 | 4/2021 | |

OTHER PUBLICATIONS

English language translation for Rejection for Chinese corresponding application No. 202211263261.3 dated Dec. 14, 2023, 4p.

Examination Report for corresponding Indian application No. 202217022908 dated Jan. 18, 2024, 6p, in Indian and English lanuages.

Final Office Action (Notice of Final Rejection) for corresponding Japanese application No. 2022-522627 dated Jan. 10, 2024, 4p.

English language translation of Notice of Final Rejection for corresponding Japanese application No. 2022-522627 dated Jan. 10, 2024, 5p.

First Office Action for corresponding Chinese application No. 202211263261.3 dated Jun. 19, 2023, 6p.

English language translation of First Office Action for corresponding Chinese application No. 202211263261.3 dated Jun. 19, 2023.

Official Action for corresponding Japanese application No. 2022-522627 dated Aug. 21, 2023, 2p.

English language translation for Official Action for corresponding Japanese application No. 2022-522627 dated Aug. 21, 2023, 4p.

ZTE et al., "TEI proposal on aperiodic RS triggering Offset", 3GPP TSG RAN WG1 Meeting #98b, R1-1910298, Oct. 20, 2019, 10p, CN.

Intel Corporation, "On cross-slot scheduling operation for power saving", 3GPP TSG RAN WG1 Meeting #98b, R1-1910672, Oct. 20, 2019, 8p, CN.

Extended European Search Report for corresponding European patent application No. 20876828.3 dated Oct. 10, 2023, 12p.

ZTE et al., "TEI proposal on aperiodic RS triggering offset" 3GPP TSG RAN WG1 Meeting #98bis, R1-1910289, Oct. 20, 2019, 7p, CN.

Ericsson, "UL signals and channels for NR-U", 3GPP TSG-RAN WG1 Meeing #98bis, R1-1910946, Oct. 20, 2019, 24p, CN.

ZTE et al., "Considerations on UL reference signals and channels design for NR-U", 3GPP TSG RAN WG1 Meeting #98bis, R1-1909973, Oct. 18, 2019, 8p, CN.

International Search Report for priority application No. PCT/CN2020/120657 dated Dec. 30, 2020, in English and Chinese languages, 8p.

Written Opinion of International Search Authority for priority application No. PCT/CN2020/120657, Dec. 30, 2020, with English Translation, 8p.

Samsung, "UL beam management", 3GPP TSG RAN WG1 NR Ad-Hoc#2 R1-1710653, Jun. 27-30, 2017, Sections 1-4, 5p, China.

CATT, "Remaining details on beam management", 3GPP TSG RAN WG1 Meeting 91 R1-1720182, Nov. 27-Dec. 1, 2017, Sections 1-4, 11p, US.

Office Action issued in Japanese Patent Application No. 2024-077221 dated May 19, 2025, with English translation (9 pages).

Written Opinion issued in Vietnamese Patent Application No. 1-2022-02996 dated Jun. 6, 2025, with English translation (3 pages).

Search Report issued in EP Patent Application No. 25156549.5-1206 dated Jun. 23, 2025 (11 pages).

Office Action issued in Chinese Patent Application No. 202211263261.3 dated Jan. 7, 2025, w/English translation.

Communication under Rule 71(3) issued in European Patent Application No. 20876828.3 dated Feb. 12, 2025, 7 pages.

Office Action issued in Korean Patent Application No. 10-2022-7015692 dated Feb. 14, 2025, w/English translation, 12 pages.

\* cited by examiner

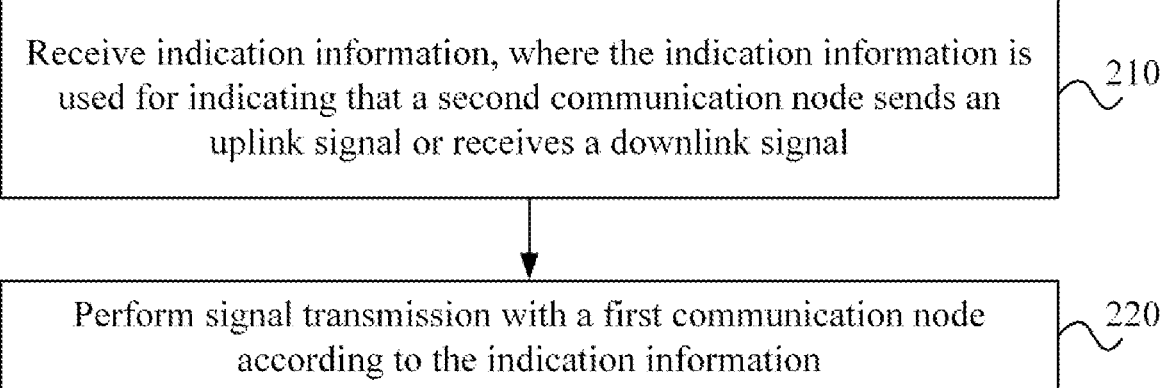

Receive indication information, where the indication information is used for indicating that a second communication node sends an uplink signal or receives a downlink signal     210

Perform signal transmission with a first communication node according to the indication information     220

FIG. 3

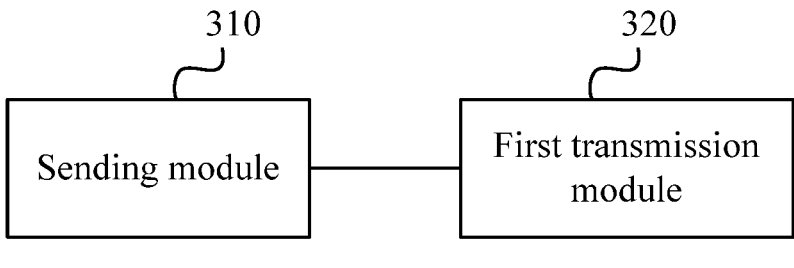

310

320

Sending module

First transmission module

FIG. 4

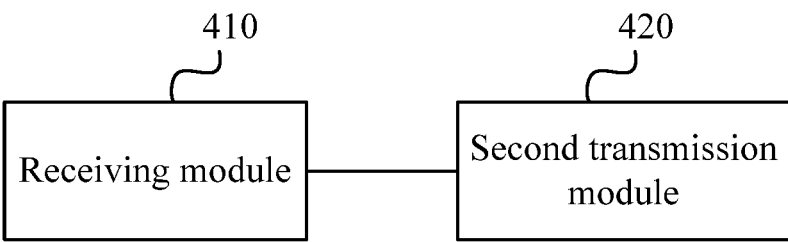

410

420

Receiving module

Second transmission module

FIG. 5

TRANSMISSION METHOD, APPARATUS, FIRST COMMUNICATION NODE, SECOND COMMUNICATION NODE, AND MEDIUM

RELATED APPLICATIONS

The application is a continuation of International Patent Application No. PCT/CN2020/120657, filed on Oct. 13, 2020, which claims priority to Chinese Patent Application No. 201910980440.0 filed with the China National Intellectual Property Administration (CNIPA) on Oct. 15, 2019, the disclosure of both of which are incorporated herein by reference in their entireties.

TECHNICAL FIELD

The present application relates to radio communication networks, for example, a transmission method and apparatus, a first communication node, a second communication node, and a medium.

BACKGROUND

With the development of communication technology, the demand for data services increases continuously. A first communication node can determine the channel state information of a second communication node according to an uplink signal, for example, a sounding reference signal (SRS) or a physical uplink shared channel (PUSCH) signal, sent by the second communication node. On this basis, the first communication node performs operations including frequency-domain selective scheduling and closed-loop power control. Additionally, the first communication node may also send a downlink signal, for example, a channel state information-reference signal (CSI-RS) or a physical downlink shared channel (PDSCH), to the second communication node so that the second communication node receives, processes, or measures the downlink signal. Various situations exist in the preceding process of signal transmission. For example, the second communication node may be configured with multiple antenna groups, and uplink signals or downlink signals may be transmitted through different uplink or downlink slots. In the related art, the flexibility of signal transmission between the first communication node and the second communication node is poor, failing to guarantee a valid and accurate signal transmission in any situation, even leading to a signal sending link being inconsistent with a signal receiving link, and thus affecting the reliability of communication.

SUMMARY

The present application provides a transmission method and apparatus, a first communication node, a second communication node, and a medium so as to improve the flexibility of signal transmission and the reliability of communication.

Embodiments of the present application provide a transmission method. The method includes the following.

Indication information is sent. The indication information is used for indicating that a second communication node sends an uplink signal or indicating that the second communication node receives a downlink signal.

Signal transmission is performed with the second communication node according to the indication information.

Embodiments of the present application further provide a transmission method. The method includes the following.

Indication information is received. The indication information is used for indicating that a second communication node sends an uplink signal or receives a downlink signal.

Signal transmission is performed with a first communication node according to the indication information.

Embodiments of the present application provide a transmission apparatus. The transmission apparatus includes a sending module and a first transmission module.

The sending module is configured to send indication information. The indication information is used for indicating that a second communication node sends an uplink signal or receives a downlink signal.

The first transmission module is configured to perform signal transmission with the second communication node according to the indication information.

Embodiments of the present application provide a transmission apparatus. The transmission apparatus includes a receiving module and a second transmission module.

The receiving module is configured to receive indication information. The indication information is used for indicating that a second communication node sends an uplink signal or receives a downlink signal.

The second transmission module is configured to perform signal transmission with a first communication node according to the indication information.

Embodiments of the present application further provide a first communication node. The first communication node includes one or more processors and a storage apparatus configured to store one or more programs.

The one or more programs, when executed by the one or more processors, causes the one or more processors to implement the preceding transmission method.

Embodiments of the present application further provide a second communication node. The second communication node includes one or more processors and a storage apparatus configured to store one or more programs.

The one or more programs, when executed by the one or more processors, causes the one or more processors to implement the preceding transmission method.

Embodiments of the present application further provide a computer-readable storage medium for storing a computer program which, when executed by a processor, causes the processor to perform the preceding transmission method.

BRIEF DESCRIPTION OF THE DRAWINGS

FIG. 3 is a flowchart of another transmission method according to one embodiment.

FIG. 4 is a diagram illustrating the structure of a transmission apparatus according to one embodiment.

FIG. 5 is a diagram illustrating the structure of another transmission apparatus according to one embodiment.

DETAILED DESCRIPTION

Figure 1:
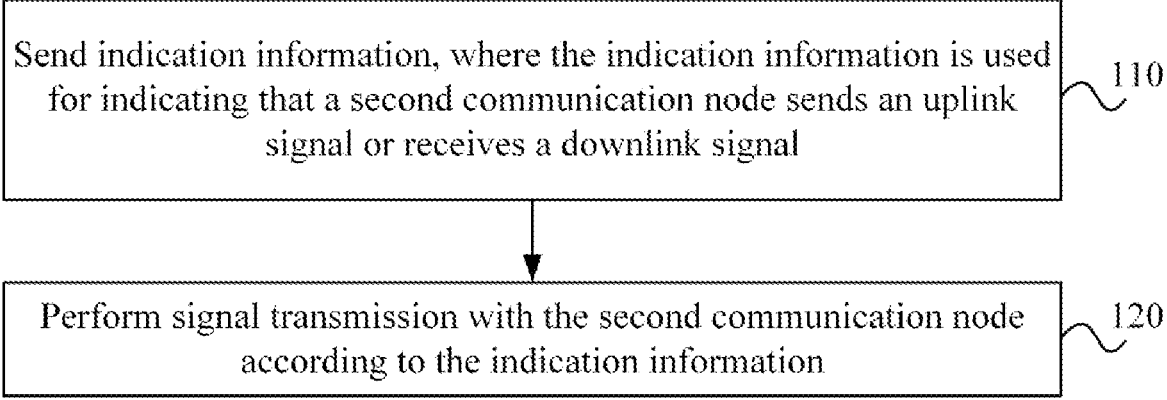
FIG. 1 is a flowchart of a transmission method according to one embodiment.

The present application is described hereinafter in conjunction with drawings and embodiments. It is to be understood that the embodiments described herein are intended to illustrate the present application and not to limit the present application. For ease of description, only part, not all, of structures related to the present application are illustrated in the drawings.

In Long Term Evolution (LTE), a physical downlink control channel (PDCCH) is used for carrying downlink control information (DCI) that may include uplink scheduling information, downlink scheduling information, and uplink power control information. DCI formats include DCI formats 0, 1, 1A, 1B, 1C, 1D, 2, 2A, 3, 3A, etc; and DCI formats 2B, 2C, and 2D are later added to evolved LTE-A Release 12 to support a variety of different applications and transmission modes. A first communication node can configure a device of a second communication node through the DCI. For example, the first communication node may be an evolved base station (e-Node-B or eNB), and the second communication node may be a user equipment (UE). Alternatively, the device of the second communication node may accept the configuration through higher layers; that is, the second communication node is configured through higher-layer signaling.

A sounding reference signal (SRS) is a signal used between the second communication node and the first communication node for measuring channel state information (CSI). In the LTE system, the second communication node periodically sends an uplink SRS on the last data symbol of a sending subframe according to parameters, indicated by the first communication node, such as a frequency band, a frequency domain position, a sequence cyclic shift, a period, and a subframe offset. The first communication node determines the uplink CSI of the second communication node according to the received SRS, and performs operations such as frequency domain selection scheduling and closed loop power control according to the obtained CSI.

In LTE-A Release 10, it is proposed that in uplink communication, a non-precoded SRS, that is, an antenna-specific SRS, may be used, while a demodulation reference signal (DMRS) of a PUSCH is precoded. The first communication node may estimate original uplink CSI by receiving the non-precoded SRS, while may not estimate the original uplink CSI through the precoded DMRS. In this case, when the second communication node sends the non-precoded SRS by using multiple antennas, more SRS resources are required by each second communication node, which results in a decrease in the number of second communication nodes that can be simultaneously reused in a radio communication system. The second communication node may be triggered, through the higher-layer signaling (also referred to as trigger type 0) or the DCI (also referred to as trigger type 1), to send the SRS. A periodic SRS is triggered based on the higher-layer signaling, and a non-periodic SRS is triggered based on the DCI. In LTE-A Release 10, a manner of sending the non-periodic SRS is added, which improves the utilization rate of SRS resources to some extent and improves the flexibility of resource scheduling.

With the development of communication technology, the demand for data services increases continuously and available low-frequency carriers are in short supply. Therefore, high-frequency (30 to 300 GHz) carrier communication which has not been fully utilized has become an important communication way of achieving high-speed data communication in the future. The high-frequency carrier communication has a large available bandwidth and can provide a valid high-speed data communication. However, a big technical challenge for the high-frequency carrier communication is that high-frequency signals fade significantly in space compared with low-frequency signals. Although this will cause spatial fading losses when the high-frequency signals are used for outdoor communication, the shorter wavelength of the high-frequency signals usually allows using more antennas. Therefore, the communication is implemented based on beams to compensate for the spatial fading losses. However, in the case where the number of antennas increases, each antenna needs a set of radio frequency links, and digital beamforming thus brings about an increase in costs and a loss in power. Therefore, studies are more inclined to hybrid beamforming, that is, a final beam formed by radio frequency beams together with digital beams.

Above all, various situations exist in the process of signal transmission. For example, the second communication node may be configured with multiple antenna groups, and uplink signals or downlink signals may be transmitted through different uplink or downlink slots. In the related art, the flexibility of signal transmission between the first communication node and the second communication node is poor, failing to guarantee a valid and accurate signal transmission in any situation, even leading to a signal sending link being inconsistent with a signal receiving link, and thus affecting the reliability of communication.

A transmission method is provided in embodiments of the present application. Through sending indication information, it indicates that the second communication node sends an uplink signal or receives a downlink signal. The method is suitable for various signal transmission situations, improving the flexibility of signal transmission between the first communication node and the second communication node and guaranteeing the reliability of transmission.

In the embodiments hereinafter, the first communication node may be, for example, a base station of a macro cell, a base station or transmission node of a small cell, a sending node in a high-frequency communication system, or a sending node in an Internet of Things system; and the second communication node may be a node in a communication system, such as a UE, a mobile phone, a portable device, a car, or a satellite node.

In the embodiments hereinafter, the uplink signal may be an SRS, an uplink DMRS, an uplink signal for random access, a PUSCH signal, or a phase tracking reference signal.

In the embodiments hereinafter, the information of an antenna or antenna group may be the identification information of the antenna or antenna group, the port information of the antenna or antenna group, or the beam identification information corresponding to the antenna or antenna group.

In the embodiments hereinafter, the information indicating an SRS resource may be, for example, an SRS sequence or an SRS time-frequency position parameter.

In the embodiments hereinafter, the channel reciprocity problem can be solved through the handover of SRS antennas in the case where the number of sending links of the second communication node is inconsistent with the number of receiving links of the second communication node, for example, in the case where the second communication node is configured to support 1T2R, 2T4R, or 4T8R. T represents the number of sending links. R represents the number of receiving links. For example, 1T2R represents that the number of sending links is 1 and that the number of receiving links is 2.

In the embodiments hereinafter, a slot is taken as a time unit. A time unit may also be a symbol, a subframe, or a frame.

FIG. 1 is a flowchart of a transmission method according to one embodiment. The transmission method provided in this embodiment may be applied to a first communication node. As shown in FIG. 1, the method includes 110 and 120.

In 110, indication information is sent. The indication information is used for indicating that a second communication node sends an uplink signal or receives a downlink signal.

In 120, signal transmission is performed with the second communication node according to the indication information.

In the transmission method in this embodiment, through sending the indication information, it indicates that the second communication node sends the uplink signal or receives the downlink signal. The method is suitable for various signal transmission situations, improving the flexibility of signal transmission between the first communication node and the second communication node and guaranteeing the reliability of transmission.

In one embodiment, the indication information includes an antenna group association parameter. The antenna group association parameter corresponds to an antenna group for sending the uplink signal.

In one embodiment, at least one of the following is included: The antenna group association parameter is configured in a sounding reference signal (SRS) resource configured through higher-layer signaling or an SRS resource set configured through the higher-layer signaling; or a cyclic redundancy check code corresponding to downlink control information (DCI) is scrambled according to a mask selected by the antenna group, where the indication information is sent through the DCI.

For example, the first communication node may be a base station, and the second communication node may be a UE. For the UE supporting 2T4R, UE antennas can be divided into two groups. Each group of antennas supports 1T2R. Through measuring the uplink signal, the base station can determine a group of antennas with better configuration and indicates through signaling that the UE sends the uplink signal on that group of antennas. The method in which the antenna group for the UE sending the uplink signal is indicated through signaling includes at least one of the following: 1) The antenna group association parameter is configured in the SRS resource configured through the higher-layer signaling or the SRS resource set configured through the higher-layer signaling, where the antenna group association parameter is used for indicating antenna group 0 or antenna group 1; for example, antenna group association parameters are configured for antenna group 0 or antenna group 1 respectively so as to indicate the antenna group for sending an aperiodic SRS, and a corresponding aperiodic SRS-resource trigger is configured for an antenna group association parameter; 2) the antenna group for the UE sending the uplink signal is indicated dynamically through the DCI; 3) a cyclic redundancy check (CRC) added behind the DCI is scrambled using the mask selected by the antenna group so as to implement the function of dynamically indicating the antenna group.

Additionally, the UE has the following types of capabilities in sending/receiving antenna ports: t1r1-t1r2, t1r1-t1r2-t1r4, t1r1-t1r2-t2r4, t1r1-t2r2, and t1r1-t2r2-t4r4. For example, for t1r1-t1r2-t1r4, three parameters, t1r1, t1r2, and t1r4, may be configured in the SRS resource configured through the higher-layer signaling or the SRS resource set configured through the higher-layer signaling. Moreover, aperiodic SRS-resource trigger 1, aperiodic SRS-resource trigger 2, and aperiodic SRS-resource trigger 3 are associated with and configured for the parameters respectively. When the DCI dynamically triggers the aperiodic SRS, one configuration can be selected dynamically from t1r1, t1r2, and t1r4 to be used for signal transmission.

In one embodiment, the indication information includes a first slot offset parameter. The first slot offset parameter corresponds to a slot for sending an uplink signal. The uplink signal includes an aperiodic SRS.

In one embodiment, the method further includes configuring the first slot offset parameter in the SRS resource configured through the higher-layer signaling or the SRS resource set configured through the higher-layer signaling.

In one embodiment, the method further includes that in the case where a plurality of first slot offset parameters are configured in the SRS resource or the SRS resource set, the first slot offset parameters are determined according to an SRS request domain of the DCI. The first slot offset parameters are associated with a plurality of aperiodic SRS-resource trigger parameters or code points.

In this embodiment, a plurality of slot offset parameters (SlotOffsets) are configured in the SRS resource set, and a corresponding aperiodic SRS-resource trigger is configured for each SlotOffset to enhance the flexibility of sending the aperiodic SRS. For example, the base station configures two SlotOffsets for the SRS resource set of the UE. The two SlotOffsets are SlotOffset0 and SlotOffset 1 respectively. Moreover, values of aperiodic SRS-resource triggers corresponding to SlotOffset0 and SlotOffset 1 are configured to be 1 and 3 respectively. In this case, through the SRS request domain in the DCI, the base station can dynamically select one SlotOffset and indicate the SlotOffset to the UE for sending the aperiodic SRS. For example, when the value of the SRS request domain in the DCI is 01, SlotOffset0 corresponding to the aperiodic SRS-resource trigger whose value is 1 is indicated to the UE; and when the value of the SRS request domain in the DCI is 11, SlotOffset1 corresponding to the aperiodic SRS-resource trigger whose value is 3 is indicated to the UE. Therefore, the flexibility of sending the aperiodic SRS is improved.

In embodiments of the present application, "first", "second" and the like are only used for distinguishing different situations, but may represent the same parameter or different parameters. For example, SlotOffset represents a first slot offset parameter in one embodiment and may also represent a second slot offset parameter in another embodiment, which is used for representing an offset between a slot for transmitting a signal and a slot for triggering the transmitted signal. In another example, n+SlotOffset represents a first target slot in one embodiment and may also represent a second target slot in another embodiment which is used for representing a slot for transmitting the signal.

In one embodiment, the indication information includes a sub-band parameter. The sub-band parameter corresponds to a sub-band for sending the uplink signal. The uplink signal includes the SRS. The indication information is used for indicating that the second communication node sends the SRS on the sub-band repeatedly or in a frequency-hopping manner.

In one embodiment, the method further includes that a broadband SRS sent by the second communication node is received and that the sub-band is determined through measuring the broadband SRS.

In one embodiment, the broadband SRS is sent through part of physical resource blocks in an activated bandwidth part (BWP) by the second communication node.

In this embodiment, the first communication node indicates that the second communication node sends the SRS in two procedures to enhance the coverage of the SRS and improve the measurement accuracy of the SRS.

In 1, the second communication node sends the broadband SRS on the activated bandwidth part (BWP); moreover, to enhance the coverage of the SRS, the SRS is sent only on part of the physical resource blocks (PRBs).

In 2, through measuring the broadband SRS, the first communication node determines part of sub-bands to be accurately measured and indicates them to the second communication node through signaling. After receiving the signaling indication, the second communication node sends the SRS on the part of sub-bands repeatedly or in a frequency-hopping manner.

In one embodiment, the indication information is sent through the DCI used for uplink scheduling or downlink scheduling. The uplink signal includes the SRS.

In one embodiment, the indication information includes a configuration parameter of the SRS. The configuration parameter includes at least one of the following: the corresponding antenna group association parameter for sending the SRS, a slot offset association parameter, the spatial relationship of a beam, a frequency domain position, or the cyclic shift of an SRS sequence.

In this embodiment, the first communication node triggers the sending of the SRS through the DCI for uplink or downlink scheduling without a PUSCH/PDSCH and dynamically indicates the configuration parameter of the SRS in the DCI. The configuration parameter includes at least one of the following: the corresponding antenna group association parameter for sending the SRS, the slot offset association parameter, the spatial relationship of the beam (the spatial relationship of the beam for sending the SRS can be determined according to the spatial relationship of a corresponding beam for sending an SRS, CSI-RS, or synchronization signal/physical broadcast channel block (SSB) that is received), the frequency domain position, or the cyclic shift of the SRS sequence.

For example, the value of the domain, a UL-SCH indicator, in DCI format 0_1 may be set to 0, and/or the value or state in a CSI request domain is set to all 0s; accordingly, DCI format 0_1 is used for triggering the aperiodic SRS. Alternatively, from the perspective of the UE, the UE does not expect to receive DCI format 0_1 with the value of the UL-SCH indicator being 0, the CSI request domain being all 0s, and the SRS request domain being all 0s.

In one embodiment, in the case of using the DCI to trigger the aperiodic SRS, the indication information is used for indicating that the second communication node sends the aperiodic SRS resource set on a first target slot. The first target slot is a (k+1)th available slot or valid slot after a slot corresponding to the first slot offset parameter. k is 0 or a positive integer.

In one embodiment, in the case of using the DCI to trigger the aperiodic SRS, the indication information is used for indicating that the second communication node sends the aperiodic SRS resource set on the first target slot. The first target slot is a (k+1)th available slot or valid slot counted from a reference slot. Alternatively, the first target slot is a (k+1)th available slot or valid slot among N slots counted from the reference slot. k is 0 or a positive integer. N is a positive integer within a first preset range or is equal to a product of E and (k+1). E is a positive integer within a second preset range. The reference slot is a slot corresponding to a value obtained by rounding down a product of n and a first parameter. n corresponds to a slot for triggering the aperiodic SRS. The first parameter is a ratio of 2 to the $\mu_{SRS}$th power to 2 to the $\mu_{PDCCH}$th power. $\mu_{SRS}$ is the subcarrier spacing configuration of the triggered SRS. $\mu_{PDCCH}$ is the subcarrier spacing configuration of a physical downlink control channel (PDCCH) carrying a triggering command. The spacing between a first symbol of an SRS resource of the first target slot and a last symbol of the PDCCH triggering the aperiodic SRS is greater than or equal to a preset value.

In one embodiment, k is determined through at least one of the following manners: k is configured through radio resource control (RRC) signaling, k is equal to the first slot offset parameter, k is configured through the RRC signaling and corresponds to one SRS trigger state or one antenna group association parameter, k corresponds to a control resource set, corresponding to the slot where the PDCCH triggering the SRS is located, or k is a preset value.

In one embodiment, in the case of using the DCI to trigger the aperiodic SRS, the indication information is used for indicating that the second communication node sends the aperiodic SRS on a second target slot. The second target slot is a first valid slot among slots configured in the SRS resource or SRS resource set of the second communication node. Alternatively, the second target slot is a slot, among corresponding valid slots in the SRS resource or SRS resource set of the second communication node, having the smallest slot offset against the slot where the PDCCH triggering the aperiodic SRS is located.

In one embodiment, in the case of using the DCI to trigger the aperiodic SRS, or in the case where the SRS resource or at least one SRS resource in the SRS resource set configured for the slot corresponding to the first slot offset parameter or configured for the slot where the PDCCH triggering the aperiodic SRS is located is on at least one downlink symbol, the indication information is used for indicating that the second communication node sends the aperiodic SRS on a third target slot. The third target slot is a first valid slot among N slots after the slot where the PDCCH triggering the aperiodic SRS is located. Alternatively, the third target slot is a first valid slot among N slots after the slot corresponding to the first slot offset parameter. N is a positive integer within the first preset range.

In one embodiment, in the case where the indication information is used for indicating that the second communication node sends the uplink signal and where the indication information does not include the first slot offset parameter, the indication information is used for indicating that the second communication node sends the aperiodic SRS on the third target slot. The third target slot is the first valid slot among the N slots after the slot where the PDCCH triggering the aperiodic SRS is located. Alternatively, the third target slot is the first valid slot among the N slots after the slot corresponding to the first slot offset parameter. N is a positive integer within the first preset range.

In one embodiment, in the case where no valid slot exits among the N slots, the indication information is used for indicating that the second communication node sends the aperiodic SRS on the slot corresponding to the first slot offset parameter or on part of symbols in a last slot among the N slots.

In one embodiment, a valid slot includes at least one of the following: an uplink slot, a special slot, or a flexible slot which is available or valid; an uplink slot, a special slot, or a flexible slot that is used for sending the SRS resource or at least one SRS resource in the SRS resource set; an uplink slot, a special slot, or a flexible slot that is used for sending the SRS resource or all SRS resources in the SRS resource set; an uplink slot that is used for sending the SRS resource or at least one SRS resource in the SRS resource set and does not conflict with an uplink slot that is used for sending another uplink signal, or a special slot that is used for sending the SRS resource or at least one SRS resource in the SRS resource set and does not conflict with a special slot that is used for sending another uplink signal, or a flexible slot that is used for sending the SRS resource or at least one SRS resource in the SRS resource set and does not conflict with a flexible slot that is used for sending another uplink signal; or a slot satisfying there is at least one uplink symbol used for sending the SRS resource or sending all the SRS resources in the SRS resource set and which satisfying the minimum timing requirement between the PDCCH triggering the aperiodic SRS and the sending of all the SRS resources in the SRS resource set.

Figure 2:
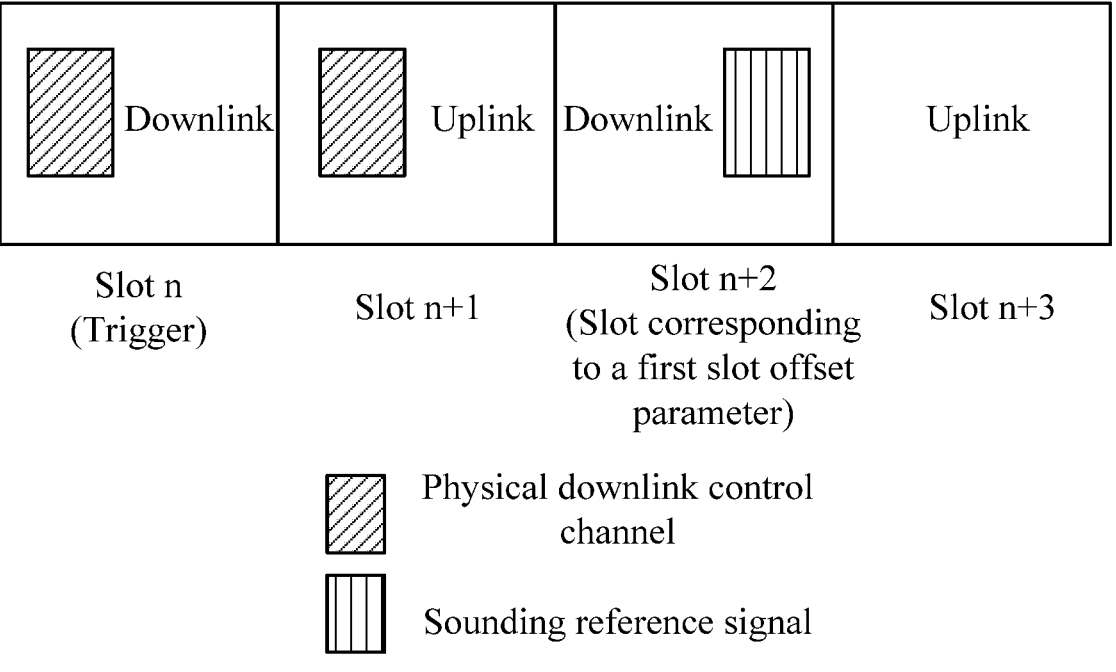
FIG. 2 is a diagram illustrating that a slot offset parameter of signal transmission is modified according to one embodiment.

In this embodiment, the first communication node may be a base station, and the second communication node may be a UE. The base station may configure the SRS resource set for the UE through the radio resource control (RRC) signaling. The SRS resource set includes the SlotOffset of the slot for sending the aperiodic SRS. However, DCI format 2-0 can dynamically modify a slot format and dynamically modify the SlotOffset-determined slot for sending the aperiodic SRS into a downlink slot. In this case, the SlotOffset parameter is no longer be applicable, resulting in a failure in determining the slot for sending the aperiodic SRS. FIG. 2 is a diagram illustrating that a slot offset parameter of signal transmission is modified according to one embodiment. As shown in FIG. 2, slot n is the slot where the PDCCH triggering the SRS is located. The SlotOffset-determined slot for sending the aperiodic SRS is slot n+SlotOffset (FIG. 2 shows an example in which n=2). When slot n+SlotOffset is a valid slot, the aperiodic SRS resource set is sent on slot n+SlotOffset. However, in the case where DCI format 2-0 modifies slot n+SlotOffset into a downlink slot, the slot for sending the aperiodic SRS cannot be determined. To solve the preceding problem, at least one of the solutions below is included.

In solution one, slot n+SlotOffset is not a valid slot, and then it is predefined that the UE sends the aperiodic SRS resource set on the (k+1)th valid slot after slot n or slot n+SlotOffset. k may be 0 or a positive integer. k is determined through at least one of the following manners: 1) The base station configures k for the UE through the RRC signaling; 2) k is equal to SlotOffset; 3) the base station configures a plurality of k values for the UE through the RRC signaling, and the k values correspond to a plurality of SRS trigger states or aperiodic SRS-resource triggers respectively; 4) k is associated with the control resource set (CORESET); 5) k is associated with the slot where the PDCCH triggering the SRS is located; or 6) k a preset value, for example, 0 or another preset value.

In solution two, it is predefined that the UE sends the aperiodic SRS resource set on the (k+1)th valid slot after slot n. The spacing between the first symbol of the SRS resource of the (k+1)th slot and the last symbol of the PDCCH triggering the aperiodic SRS is greater than or equal to N2 or is greater than or equal to N2+14. N2 is obtained according to the NR protocol of Rel-15 and is a value determined based on subcarrier spacing and the processing capacity of the UE. Alternatively, it is predefined that the UE sends the aperiodic SRS resource set on the (k+1)th valid slot after slot n. The spacing between the first symbol of the SRS resource of the (k+1)th slot and the last symbol of the PDCCH triggering the aperiodic SRS is greater than or equal to a preset value A. An acquisition parameter of the preset value A includes at least one of the following: the minimum value between the PDCCH for scheduling an uplink channel and/or an uplink signal and a sending of the uplink channel and/or the unlink signal, or the subcarrier spacing relationship between the PDCCH and the SRS. For example, when the subcarrier spacing of the PDCCH is the same as the subcarrier spacing of the SRS, preset value A is a first value; when the subcarrier spacing of the PDCCH is different from the subcarrier spacing of the SRS, preset value A is a second value; and the first value is smaller than or equal to the second value. For example, preset value A is $N_2$ or is greater than or equal to $N_2+14$; alternatively, preset value A is that $T_{proc,2}=\max\ ((N_2+d_{2,1})(2048+144)\cdot\kappa2^{-\mu}\cdot T_c,d_{2,2})$. $N_2$ is obtained according to the subcarrier spacing of the SRS. Different subcarrier spacing corresponds to different $N_2$ values. The correspondence relationship between the subcarrier spacing and the $N_2$ values is agreed upon by the base station and the terminal. $d_{2,1}$ is 0 or 1. When the PDCCH triggers a BWP handover, $d_{2,2}$ is BWP handover time; otherwise, $d_{2,2}$ is 0. $\kappa$ is 64. $T_c$ is a time unit; for example, $T_c=1/(480*10^3*4096)$ seconds. k may be 0 or a positive integer. k is determined through at least one of the following manners: 1) The base station configures k for the UE through the RRC signaling; 2) k is equal to SlotOffset; 3) the base station configures a plurality of k values for the UE through the RRC signaling, and the k values correspond to a plurality of SRS trigger states or aperiodic SRS-resource triggers respectively; 4) k is associated with the CORESET; 5) k is associated with the slot where the PDCCH triggering SRS is located; or 6) k a preset value, for example, 0 or another preset value.

In solution three, the SRS resource set configured by the base station for the UE includes a plurality of SlotOffsets, for example, SlotOffset 1, SlotOffset 2, SlotOffset 3, and SlotOffset 4. Then the UE looks for a valid slot in slot n+SlotOffset 1, slot n+SlotOffset 2, slot n+SlotOffset 3, and slot n+SlotOffset 4 in sequence and sends the SRS resource set on a first valid slot. For example, it is determined first whether n+SlotOffset 1 is a valid slot. When n+SlotOffset 1 is an invalid slot, it is then determined whether n+SlotOffset 2 is a valid slot. When n+SlotOffset 2 is a valid slot, the UE sends the SRS resource set on slot n+SlotOffset 2. Alternatively, the UE first determines whether each of slot n+SlotOffset 1, slot n+SlotOffset 2, slot n+SlotOffset 3, and slot n+SlotOffset 4 is a valid slot. For example, it is determined that slot n+SlotOffset 2 and slot n+SlotOffset 3 are valid slots. Then the UE sends the SRS resource set on slot min (n+SlotOffset 2, n+SlotOffset 3).

In solution four, for the configured SlotOffset or the triggered offset, it is set that at least one SRS resource in the triggered aperiodic SRS resource set is on at least one downlink symbol. In this case, the SRS resource is sent on a first valid slot among the N slots after slot n+SlotOffset or after slot n. N is a predefined integer between 1 and 50.

In solution five, when no valid slot is found among the N slots after slot n or after slot n+SlotOffset, the UE sends part of the SRS resources in the SRS resource set on part of symbols in slot n+SlotOffset or on part of symbols in slot n+SlotOffset+N. N is a predefined integer between 1 and 50.

In addition to the preceding solutions, in the case where the first communication node indicates that the second communication node sends the SRS but where no SlotOffset is configured in the SRS resource set, solutions four and five may also be used. That is, the SRS resource set is sent on the first valid slot among the N slots after slot n+SlotOffset or after slot n. Moreover, when no valid slot is found among the N slots after slot n+SlotOffset, the UE sends part of the SRS resources in the SRS resource set on part of the symbols in slot n+SlotOffset or on part of the symbols in slot n+SlotOffset+N. N is a predefined integer between 1 and 50.

In the preceding solutions, a valid slot includes at least one of the conditions hereinafter. 1) The valid slot is an uplink slot or a special slot or a flexible slot which is available or valid. A special slot refers to a mixed slot that can be used for sending both an uplink signal and a downlink signal. For example, the transmission direction of each time-domain symbol where the at least one SRS resource is located is not downlinked. In the valid slot, the transmission direction of a time-domain symbol where the SRS is located may be uplinked; alternatively, the time-domain symbol is a flexible symbol, for example, a flexible time-domain symbol. The transmission direction is acquired through slot structure information. 2) The valid slot is an uplink slot or a special slot that is used for sending at least one SRS resource in the SRS resource set. 3) The valid slot is an uplink slot or special slot that is used for sending all the SRS resources in the SRS resource set. 4) The valid slot is an uplink slot or a special slot that is used for sending at least one SRS resource in the SRS resource set and does not conflict with another uplink signal. Another signal may refer to an uplink signal, for example, a periodic SRS, another aperiodic SRS, a PUSCH, or a PUCCH. 5) The valid slot is a slot that is used for sending all the SRS resources in the SRS resource set and satisfies the minimum timing requirement between the PDCCH and the sending of the SRS. 6) The time interval between the PDCCH and a starting time-domain symbol of the SRS resource in the valid slot is greater than or equal to predetermined value A. 7) The time interval between the PDCCH and a starting time-domain symbol of the SRS resource set in the valid slot is greater than or equal to predetermined value A. 8) The valid time unit is within a predetermined time window after the PDCCH. 9) Time structure information does not change between the PDCCH and the valid slot. 10) The time interval between a latest PDCCH, including the slot structure information, in front of the valid time unit and a starting symbol of the sounding reference signal resource in the valid slot is greater than or equal to a first predetermined time interval. 11) The time structure information does not change after the PDCCH and within the predetermined time window. 12) The same slot structure information is grounded between the PDCCH and the valid slot. 13) The same slot structure information is grounded after the PDCCH and within the predetermined time window. 14) In the slot, the transmission direction of each time-domain symbol occupied by all the SRS resources in the SRS resource set is not downlinked; for example, it may be an uplink or flexible time-domain symbol or a special time-domain symbol. The transmission direction is acquired through the slot structure information. That is, the valid slot is looked for at the SRS resource set level. 15) In the slot, the transmission direction of a time-domain symbol occupied by the SRS resource is not downlinked. For example, it may be an uplink or flexible time-domain symbol or a special time-domain symbol. The transmission direction is acquired through the slot structure information. That is, the valid slot is looked for at the SRS resource level. Whether to look for the valid slot based on the CSI-RS resource set level or the CSI-RS resource level can be optionally determined according to the configuration information in the CSI-RS resource set. For example, when the configuration in the SRS set is beam management, the valid slot is looked for according to the CSI-RS resource set level; otherwise, the valid slot is looked for independently based on each CSI-RS resource. The preceding PDCCH is the PDCCH scheduling the SRS. 16) The valid slot is an uplink slot or a special slot that enables the sending of all the SRS resources in the SRS resource set not to conflict with another signal.

For example, when the UE receives, on slot n, the DCI triggering the aperiodic SRS, the UE sends the aperiodic SRS resource set on the (k+1)th valid slot among 10 (k+1) slots counted from $$\left\lfloor n \cdot \frac{2^{\mu_{SRS}}}{2^{\mu_{PDCCH}}} \right\rfloor.$$

k is a value configured through higher-layer parameter SlotOffset. $\mu_{SRS}$ is the subcarrier spacing configuration of the triggered SRS. $\mu_{PDCCH}$ is the subcarrier spacing configuration of the PDCCH carrying the triggering command. The slot satisfying that there is at least one uplink symbol used for sending the SRS resource or sending all the SRS resources in the SRS resource set and satisfying the minimum timing requirement between the PDCCH triggering the aperiodic SRS and the sending of all the SRS resources in the resource set is a valid slot. In the case where a plurality of triggered CSI-RS resources conflict with each other, only an aperiodic SRS resource triggered by the latest DCI is sent.

In one embodiment, the indication information includes a second slot offset parameter. The second slot offset parameter corresponds to a slot for receiving a downlink signal. The downlink signal includes a channel state information reference signal (CSI-RS). The indication information is used for indicating that the second communication node receives an aperiodic CSI-RS.

In one embodiment, the method further includes configuring the second slot offset parameter in a CSI-RS resource configured through the higher-layer signaling or a CSI-RS resource set configured through the higher-layer signaling.

In one embodiment, as for the aperiodic CSI-RS resource set triggered by the DCI, the indication information is used for indicating that the first communication node sends the aperiodic CSI-RS resource set on a fourth target slot. The fourth target slot is an (h+1)th available slot or valid slot counted from a slot for triggering the aperiodic CSI-RS resource set. Alternatively, the fourth target slot is an (h+1)th available slot or valid slot among M slots counted from the slot for triggering the aperiodic CSI-RS resource set. h is 0 or a positive integer. M is a positive integer within the first preset range or is equal to a product of F and (h+1). F is a positive integer within the second preset range.

In one embodiment, h is determined through at least one of the following manners: h is configured through the RRC signaling, h is equal to the second slot offset parameter, h is configured through the RRC signaling and corresponds to one CSI-RS trigger state, h corresponds to the control resource set, h corresponds to the slot where the PDCCH triggering the CSI-RS is located, or h is a preset value.

In one embodiment, as for the aperiodic CSI-RS resource set triggered by the DCI, the indication information is used for indicating that the first communication node sends the aperiodic CSI-RS on a fifth target slot. The fifth target slot is a first valid slot among slots configured in the CSI-RS resource set of the second communication node. Alternatively, the fifth target slot is a slot having the smallest slot offset among valid slots in the CSI-RS resource set of the second communication node.

In one embodiment, as for the aperiodic CSI-RS resource set triggered by the DCI, the indication information is used for indicating that the first communication node sends the aperiodic CSI-RS on the fifth target slot. The fifth target slot is a first valid slot among M slots after the slot where the PDCCH triggering the aperiodic CSI-RS is located. Alternatively, the fifth target slot is a first valid slot among M slots after a slot corresponding to the second slot offset parameter. M is a positive integer within the second preset range.

In one embodiment, in the case where the indication information is used for indicating that the second communication node receives the downlink signal and wherein the indication information does not include the second slot offset parameter, the indication information is used for indicating that the first communication node sends the aperiodic CSI-RS resource set on the fifth target slot. The fifth target slot is the first valid slot among the M slots after the slot where the PDCCH triggering the aperiodic CSI-RS is located. Alternatively, the fifth target slot is the first valid slot among the M slots after the slot corresponding to the second slot offset parameter. M is a positive integer within the second preset range.

In one embodiment, in the case where no valid slot exits among the M slots, the indication information is used for indicating that the first communication node sends the aperiodic CSI-RS on the slot corresponding to the second slot offset parameter or on part of symbols in a last slot among the M slots.

In one embodiment, a valid slot includes at least one of the following: a downlink slot, a special slot, or a flexible slot which is available or valid; an uplink slot, a special slot, or a flexible slot that is used for sending the CSI-RS resource or at least one CSI-RS resource in the CSI-RS resource set; an uplink slot, a special slot, or a flexible slot that is used for sending the CSI-RS resource or all CSI-RS resources in the CSI-RS resource set; an uplink slot that is used for sending a CSI-RS resource or at least one CSI-RS resource in the CSI-RS resource set and does not conflict with an uplink slot that is used for sending another uplink signal, a special slot that is used for sending a CSI-RS resource or at least one CSI-RS resource in the CSI-RS resource set and does not conflict with a special slot that is used for sending another uplink signal, or a flexible slot that is used for sending a CSI-RS resource or at least one CSI-RS resource in the CSI-RS resource set and does not conflict with a flexible slot that is used for sending another uplink signal; or a slot satisfying that there is at least one downlink symbol used for sending the CSI-RS resource or sending all the CSI-RS resources in the CSI-RS resource set and satisfying the minimum timing requirement between the PDCCH triggering the aperiodic CSI-RS and the sending of all the CSI-RS resources in the CSI-RS resource set.

In this embodiment, the first communication node may be a base station, and the second communication node may be a UE. The base station may configure the SRS resource set for the UE through the radio resource control (RRC) signaling. The SRS resource set includes a slot offset parameter aperiodicTriggeringOffset for sending the aperiodic CSI-RS. It is assumed that the slot where the PDCCH triggering the aperiodic CSI-RS is located is n. However, DCI format 2-0 can dynamically modify a slot format and dynamically modify an aperiodicTriggeringOffset-determined slot (that is, slot n+aperiodicTriggeringOffset) for sending the aperiodic CSI-RS into an uplink slot. In this case, the aperiodicTriggeringOffset parameter is no longer applicable, resulting in a failure in determining the slot for sending the aperiodic CSI-RS. To solve the preceding problem, at least one of the solutions below is included.

In solution one, slot n+aperiodicTriggeringOffset is not a valid slot, and then it is predefined that the UE sends the aperiodic CSI-RS resource set on the (h+1)th valid slot after slot n or slot n+aperiodicTriggeringOffset. h may be 0 or a positive integer. h is determined through at least one of the following manners: 1) The base station configures h for the UE through the RRC signaling; 2) h is equal to the n+aperiodicTriggeringOffset; 3) the base station configures a plurality of h values for the UE through the RRC signaling, and the h values correspond to a plurality of CSI-RS trigger states respectively; 4) h is associated with the CORESET; 5) h is associated with the slot where the physical downlink control channel (PDCCH) triggering the CSI-RS is located; or 6) h a preset value, for example, 0 or another preset value.

In solution two, it is predefined that the base station sends the aperiodic CSI-RS resource set on the (h+1)th valid slot after slot n. h may be 0 or a positive integer. h is determined through at least one of the following manners: 1) The base station configures h for the UE through the RRC signaling; 2) h is equal to the n+aperiodicTriggeringOffset; 3) the base station configures a plurality of h values for the UE through the RRC signaling, and the h values correspond to a plurality of CSI-RS trigger states respectively; 4) h is associated with the CORESET; 5) h is associated with the slot where the physical downlink control channel (PDCCH) triggering the CSI-RS is located; or 6) h a preset value, for example, 0 or another preset value.

In solution three, the CSI-RS resource set configured by the base station for the UE includes a plurality of aperiodicTriggeringOffsets, for example, aperiodicTriggeringOffset 1, aperiodicTriggeringOffset 2, aperiodicTriggeringOffset 3, and aperiodicTriggeringOffset 4. Then the UE looks for a valid slot in slot n+aperiodicTriggeringOffset 1, slot n+aperiodicTriggeringOffset 2, slot n+aperiodicTriggeringOffset 3, and slot n+aperiodicTriggeringOffset 4 in sequence and sends the CSI-RS resource set on a first valid slot. For example, it is determined first whether n+aperiodicTriggeringOffset 1 is a valid slot. When n+aperiodicTriggeringOffset 1 is an invalid slot, it is then determined whether n+aperiodicTriggeringOffset 2 is a valid slot. When n+aperiodicTriggeringOffset 2 is a valid slot, the UE sends the SRS resource set on slot n+aperiodicTriggeringOffset. The rest can be done in the same manner. Alternatively, the base station first determines whether each of slot n+aperiodicTriggeringOffset 1, slot n+aperiodicTriggeringOffset 2, slot n+aperiodicTriggeringOffset 3, and slot n+aperiodicTriggeringOffset 4 is a valid slot. For example, it is determined that slot n+aperiodicTriggeringOffset 2 and slot n+aperiodicTriggeringOffset 3 are valid slots. Then UE sends the CSI-RS resource set on slot min (n+aperiodicTriggeringOffset 2, n+aperiodicTriggeringOffset 3).

In solution four, for the configured aperiodicTriggeringOffset or the triggered offset, it is set that at least one CSI-RS resource in the triggered aperiodic CSI-RS resource set is on at least one uplink symbol. In this case, the CSI-RS resource is sent on a first valid slot among the M slots after slot n+aperiodicTriggeringOffset or after slot n. M is a predefined integer between 1 and 50.

In solution five, when no valid slot is found among the M slots after slot n+aperiodicTriggeringOffset, the base station sends part of the CSI-RS resources in the CSI-RS resource set on part of symbols in slot n+aperiodicTriggeringOffset or on part of symbols in slot n+aperiodicTriggeringOffset+N. M is a predefined integer between 1 and 50.

In addition to the preceding solutions, in the case where the first communication node indicates that the second communication node sends the CSI-RS but where no aperiodicTriggeringOffset is configured in the CSI-RS resource set, solutions four and five may also be used. That is, the CSI-RS resource set is sent on the first valid slot among the M slots after slot n+aperiodicTriggeringOffset or after slot n. Moreover, when no valid slot is found among the M slots after slot n+aperiodicTriggeringOffset, the UE sends part of the SRS resources in the SRS resource set on part of the symbols in slot n+aperiodicTriggeringOffset or on part of the symbols in slot n+aperiodicTriggeringOffset+N. M is a predefined integer between 1 and 50.

In the preceding solutions, a valid slot includes at least one of the conditions hereinafter. 1) The valid slot is a downlink slot or a special slot or a flexible slot which is available or valid. 2) The valid slot is a downlink slot or a special slot that is used for sending at least one CSI-RS resource in the CSI-RS resource set. 3) The valid slot is a downlink slot or a special slot that is used for sending at least one CSI-RS resource in the CSI-RS resource set. 4) The valid slot is a downlink slot or a special slot that is used for sending at least one CSI-RS resource in the CSI-RS resource set and does not conflict with a special slot that is used for sending another downlink signal. 5) The valid slot is a slot that is used for sending all the CSI-RS resources in the CSI-RS resource set and satisfies the minimum timing requirement between the PDCCH and the sending of the CSI-RS. 6) In the slot, the transmission direction of each time-domain symbol occupied by all the CSI-RS resources in the CSI-RS resource set is not uplinked; for example, it may be a downlink or flexible time-domain symbol or a special time-domain symbol. The transmission direction is acquired through the slot structure information. That is, the valid slot is looked for at the CSI-RS resource set level. 7) In the slot, the transmission direction of a time-domain symbol occupied by the CSI-RS resource is not uplinked. For example, it may be a downlink or flexible time-domain symbol or a special time-domain symbol. The transmission direction is acquired through the slot structure information. That is, the valid slot is looked for at the CSI-RS resource level. Whether to look for the valid slot based on the CSI-RS resource set level or the CSI-RS resource level can be optionally determined according to the configuration information in the CSI-RS resource set. For example, when on/off is configured, the valid slot is looked for according to the CSI-RS resource set level; otherwise, the valid slot is looked for independently based on each CSI-RS resource. The spacing between the PDCCH and a starting time-domain symbol of the CSI-RS resource set in the slot is greater than a second predetermined value. The second predetermined value is beamSwitchTiming. beamSwitchTiming represents a minimum timing interval in which the transmission configuration indication indicated by the PDCCH is applied to the CSI-RS for a reception. Alternatively, beamSwitchTiming represents a minimum timing interval between the PDCCH and the CSI-RS. 8) The valid slot is within the predetermined time window after the PDCCH. 9) The time structure information does not change between the PDCCH and the valid slot. 10) The time interval between the latest PDCCH, including the slot structure information, in front of the valid slot and the starting symbol of the sounding reference signal resource in the valid slot is greater than or equal to the first predetermined time interval. 11) The time structure information does not change after the PDCCH and within the predetermined time window. 12) The same slot structure information is grounded between the PDCCH and the valid slot. 13) The same slot structure information is grounded after the PDCCH and within the predetermined time window.

The preceding PDCCH is the PDCCH scheduling the CSI-RS.

For example, as for the aperiodic CSI-RS resource set triggered through the DCI in slot n, the first communication node sends the aperiodic CSI-RS resource set on the (k+1)th valid slot among 10 (k+1) slots counted from slot n. k is a value configured through the higher-layer parameter aperiodicTriggeringOffset. A slot satisfying that there is at least one downlink symbol used for sending all the CSI-RS resources in the CSI-RS resource set and satisfying the minimum timing requirement between the PDCCH triggering the aperiodic CSI-RS and the sending of all the CSI-RS resources in the CSI-RS resource set is a valid slot. In the case where a plurality of triggered CSI-RS resources conflict with each other, only an aperiodic CSI-RS resource triggered by the latest DCI is sent.

In one embodiment, the method further includes that, in the case where at least one resource in the triggered aperiodic SRS resource set or aperiodic CSI-RS resource set conflicts with another to-be-transmitted signal, removing a symbol in the conflict in the resource set, postponing the sending of the aperiodic SRS or aperiodic CSI-RS, or removing the to-be-transmitted signal in the conflict and preferentially transmitting the aperiodic SRS or aperiodic CSI-RS.

In one embodiment, the indication information is further used for indicating that, in the case where the sending of at least two aperiodic SRSs or at least two aperiodic CSI-RSs is triggered by the same DCI or different types of DCI, or in the case where a plurality of triggered SRS resources or SRS resource sets conflict with each other or a plurality of triggered CSI-RS resources or CSI-RS resource sets conflict with each other, only an aperiodic SRS resource or SRS resource set triggered by the latest DCI or only an aperiodic CSI-RS resource or CSI-RS resource set triggered by the latest DCI is transmitted, or only an aperiodic SRS resource or SRS resource set with the smallest or largest resource set identity or only an aperiodic CSI-RS resource or CSI-RS resource set with the smallest or largest resource set identity is transmitted.

In this embodiment, when one or more resources in the triggered SRS resource set (or CSI-RS resource set) conflict with another uplink signal (or downlink signal), one of the following manners is taken: A resource or symbol in the conflict is removed; the sending of the entire SRS resource set (or CSI-RS resource set) is postponed; or the uplink signal (or downlink signal) in the conflict is removed and the SRS resource set (or CSI-RS resource set) is sent preferentially.

When the base station triggers, through the same DCI or different types of DCI, a plurality of SRS resource sets (or CSI-RS resource sets) to be sent simultaneously, only an SRS resource set (or CSI-RS resource set) triggered by the latest DCI is sent, or only an SRS resource set (or CSI-RS resource set) with a small or large resource set identity (ID) is sent.

In one embodiment, the indication information includes a third slot offset parameter. The third slot offset parameter corresponds to a slot for sending a downlink signal. The downlink signal includes a PDSCH. The indication information is used for indicating that the second communication node receives the PDSCH.

In one embodiment, the method further includes configuring at least one information element through the RRC signaling. The at least one information element is used for configuring the time-domain relationship between the PDCCH and the PDSCH. The at least one information element corresponds to at least one slot offset parameter respectively. In the case where at least two information elements are included, it is determined through DCI signaling that a slot offset parameter corresponding to one information element is the third slot offset parameter.

In one embodiment, in the case where the DCI triggers the sending of the PDSCH, the indication information is used for indicating that the second communication node receives the PDSCH on a sixth target slot. The sixth target slot is an (r+1)th available or valid downlink slot or special slot after the slot where the PDCCH is located or after a slot corresponding to a sixth slot offset parameter. r is 0 or a positive integer.

In one embodiment, r is determined through at least one of the following manners: r is configured through the RRC signaling, r is equal to the third slot offset parameter, r is configured through the RRC signaling and corresponds to one CSI-RS trigger state, r corresponds to the control resource set, r corresponds to the slot where the PDCCH scheduling the PDSCH is located, or r is a preset value.

In this embodiment, the first communication node may be a base station, and the second communication node may be a UE. As for the sending of the PDSCH, according to the current sending mechanism of Rel-15 NR, the base station configures one or more information elements (IEs) PDSCH-TimeDomainResourceAllocations for the UE through the RRC signaling. The one or more information elements PDSCH-TimeDomainResourceAllocations are used for configuring the time-domain relationship between the PDCCH and the PDSCH. An information element PDSCH-TimeDomainResourceAllocation includes parameter k0 representing the offset between a slot where the PDSCH is located and the slot where the PDCCH scheduling the PDSCH is located. In the case where a plurality of information elements PDSCH-TimeDomainResourceAllocations are configured through the RRC signaling, one information element may be dynamically selected from the information elements through the DCI signaling so as to determine k0 and thus determine the slot for sending the PDSCH. However, DCI format 2-0 can dynamically modify a slot format. When the k0-determined slot for sending the PDSCH is dynamically modified into an uplink slot, the base station cannot send the PDSCH scheduled by the PDCCH. Moreover, since a limited number of bits in the DCI are used for indicating k0, the RRC signaling can configure limited k0 values for the dynamic selection of the base station, limiting the resource scheduling of the base station. To solve the preceding problem, when the preceding problem is encountered, it may be predefined that the base station sends the PDSCH on the k0th available or valid downlink slot/special slot after the slot where the PDCCH is located. Alternatively, it may be predefined that the base station sends the PDSCH on the (r+1)th available or valid downlink slot/special slot after the slot determined by parameter k0. r may be 0 or a positive integer. r is determined through at least one of the following manners: 1) The base station configures r for the UE through the RRC signaling; 2) the base station configures a plurality of r values for the UE through the RRC signaling, and the r values correspond to a plurality of CSI-RS trigger states respectively; 3) r is associated with the CORESET; or 4) r is associated with the slot where the PDCCH scheduling the PDSCH is located.

The transmission direction of a time-domain symbol occupied by the PDSCH in the valid slot is not uplinked. The transmission direction is determined through the slot structure information.

In one embodiment, the indication information includes a fourth slot offset parameter. The fourth slot offset parameter corresponds to a slot for sending an uplink signal. The uplink signal includes a PUSCH. The indication information is used for indicating that the second communication node sends the PUSCH.

In one embodiment, the method further includes configuring at least one information element through the RRC signaling. The at least one information element is used for configuring the time-domain relationship between the PDCCH and the PUSCH. The at least one information element corresponds to at least one slot offset parameter respectively. In the case where at least two information elements are included, it is determined through the DCI signaling that a slot offset parameter corresponding to one information element is the fourth slot offset parameter.

In one embodiment, in the case where the DCI triggers the sending of the PUSCH, the indication information is used for indicating that the second communication node receives the PUSCH on a seventh target slot. The seventh target slot is a (y+1)th available or valid downlink slot or special slot after the slot where the PDCCH is located or after a slot corresponding to a fourth slot offset association parameter. y is 0 or a positive integer.

In one embodiment, y is determined through at least one of the following manners: y is configured through the RRC signaling, y is equal to the fourth slot offset parameter, y is configured through the RRC signaling and corresponds to one CSI-RS trigger state, y correspond to the control resource set, or y correspond to the slot where the PDCCH scheduling the PDSCH is located.

In this embodiment, as for the sending of the PUSCH, according to the sending mechanism of Rel-15 NR, the base station configures one or more information elements (IEs) PUSCH-TimeDomainResourceAllocations for the UE through the RRC signaling. The one or more information elements PUSCH-TimeDomainResourceAllocations are used for configuring the time-domain relationship between the PDCCH and the PUSCH. An information element PUSCH-TimeDomainResourceAllocation includes parameter k2 representing the offset between a slot where the PUSCH is located and the slot where the PDCCH scheduling the PUSCH is located. In the case where a plurality of information elements PUSCH-TimeDomainResourceAllocations are configured through the RRC signaling, one information element may be dynamically selected from the information elements through the DCI signaling so as to determine k2 and thus determine the slot for sending the PUSCH. However, DCI format 2-0 can dynamically modify a slot format. When the k2-determined slot for sending the PUSCH is dynamically modified into a downlink slot, the UE cannot send the PUSCH scheduled by the PDCCH. Moreover, since a limited number of bits in the DCI are used for indicating k2, the RRC signaling can configure limited k2 values for the dynamic selection of the base station, limiting the resource scheduling of the base station. To solve the preceding problem, when the preceding problem is encountered, it may be predefined that the UE sends the PUSCH on the k2nd available or valid uplink slot/special slot after the predetermined time A of the PDCCH slot. Alternatively, it may be predefined that the UE sends the PUSCH on the (y+1)th available or valid uplink slot/special slot after the slot determined by parameter k2. y may be 0 or a positive integer. y is determined through at least one of the following manners: 1) The base station configures y for the UE through the RRC signaling; 2) the base station configures a plurality of y values for the UE through the RRC signaling, and the y values correspond to a plurality of CSI-RS trigger states respectively; 3) y is associated with the CORESET; or 4) y is associated with the slot where the PDCCH scheduling the PUSCH is located.

The transmission direction of a time-domain symbol occupied by the PUSCH in the valid slot is not downlinked. The transmission direction is determined through the slot structure information.

In one embodiment, the indication information includes a fifth slot offset parameter. The fifth slot offset parameter corresponds to a slot for sending an uplink signal. The uplink signal includes a PUCCH associated with acknowledgment and non-acknowledgment information. The indication information is used for indicating that the second communication node sends the PUCCH associated with acknowledgment and non-acknowledgment information.

In one embodiment, the method further includes configuring at least one preset parameter through the RRC signaling. The at least one preset parameter is used for configuring the time-domain relationship between the PDSCH and the PUCCH.

In one embodiment, the indication information is used for indicating that the second communication node sends the PUCCH on an eighth target slot. The eighth target slot is an (x+1)th available or valid downlink slot or special slot after the slot where the PDSCH is located or after a slot corresponding to a fifth slot offset association parameter. x is 0 or a positive integer.

In one embodiment, x is determined through at least one of the following manners: x is configured through the RRC signaling, x is equal to the fifth slot offset parameter, x is configured through the RRC signaling and corresponds to one CSI-RS trigger state, x corresponds to the control resource set, or x corresponds to the slot where the PDCCH scheduling the PDSCH is located.

In this embodiment, as for the sending of the physical uplink control channel (PUCCH) with ACK/NACK, according to the sending mechanism of Rel-15 NR, the base station configures parameter k1 for the UE through signaling. Parameter k1 is used for indicating the slot offset relationship between the PDSCH and the PUCCH with ACK/NACK. However, DCI format 2-0 can dynamically modify a slot format. When the k1-determined slot for sending the PUCCH is dynamically modified into a downlink slot, the UE cannot send the PUCCH. Moreover, since a limited number of bits in the DCI are used for indicating k1, the RRC signaling can configure limited k1 values for the dynamic selection of the base station, limiting the resource scheduling of the base station. To solve the preceding problem, when the preceding problem is encountered, it may be predefined that the UE sends the PUCCH on the k1st available or valid uplink slot/special slot after the slot where the PDSCH is located. Alternatively, it may be predefined that the UE sends the PUCCH on the (x+1)th available or valid uplink slot/special slot after the slot determined by parameter k1. x may be 0 or a positive integer. x is determined through at least one of the following manners: 1) The base station configures x for the UE through the RRC signaling; 2) the base station configures a plurality of x values for the UE through the RRC signaling, and the x values correspond to a plurality of CSI-RS trigger states respectively; 3) x is associated with the control resource set (CORESET); or 4) x is associated with the slot where the PDSCH is located. The transmission direction of a time-domain symbol occupied by the PUCCH in the valid slot is not downlinked. The transmission direction is determined through the slot structure information.

In the preceding embodiments, the slot structure information includes at least one of the following: The slot structure information is according to a time-domain symbol position where a synchronization signal is located; the slot structure information is according to a semi-persistent frame structure; the slot structure information is according to DCI format 2_0; the slot structure information is according to a time-domain symbol where a PRACH is located; the slot structure information is slot structure information before the PDCCH; the slot structure information in each time unit after the PDCCH includes valid slot structure information in each time unit; or when the transmission direction of a time-domain symbol is determined, the slot structure information is slot structure information with a higher priority than a target slot. For example, it is determined through the slot structure information that the transmission direction of one time-domain symbol is uplinked. However, the target signal is the preceding aperiodic CSI-RS/PDSCH. The priority of the slot structure information is higher; that is, the transmission direction of the time-domain symbol is uplinked. In general, in the case of determining the transmission direction of one time-domain symbol, the priority of the PDSCH/PUSCH/AP-SRS/AP-CSI-RS scheduled by the DCI is higher than the priority of a periodic signal. The transmission direction of one time-domain symbol includes uplink, downlink, and flexible. When the transmission direction is flexible, the transmission direction may be modified by the target signal to be uplinked or downlinked.

In the preceding embodiments, the slot structure information satisfies at least one of the following features: 1) In the case of determining the transmission direction of a time-domain symbol, the priority of the slot structure information is higher than the priority of the slot structure information of a target signal; 2) the time structure information does not change between the PDCCH and the valid slot; 3) the time interval between the latest PDCCH, including the slot structure information, in front of the valid time unit and the starting symbol of the sounding reference signal resource in the valid slot is greater than or equal to the first predetermined time interval; 4) the time structure information does not change after the PDCCH and within the predetermined time window; 5) the same slot structure information is grounded between the PDCCH and the valid slot; or 6) the same slot structure information is grounded after the PDCCH and within the predetermined time window.

A preceding time unit is a slot. Of course, this embodiment does not exclude determining another time unit, for example, a subframe or a frame, where an SRS is located according to the preceding rules.

Embodiments of the present application further provide a transmission method. FIG. 3 is a flowchart of a transmission method according to one embodiment. The transmission method provided in this embodiment may be applied to a second communication node. As shown in FIG. 3, the method includes 210 and 220.

In 210, indication information is received. The indication information is used for indicating that the second communication node sends an uplink signal or indicating that the second communication node receives a downlink signal.

In 220, signal transmission is performed with a first communication node according to the indication information.

The transmission method in this embodiment, through the indication information, indicates that the second communication node sends the uplink signal or receives the downlink signal. The method is suitable for various signal transmission situations, improving the flexibility of signal transmission between the first communication node and the second communication node and guaranteeing the reliability of transmission.

In one embodiment, the indication information includes an antenna group association parameter. The antenna group association parameter corresponds to an antenna group for sending the uplink signal.

In one embodiment, the antenna group association parameter is configured in a sounding reference signal (SRS) resource configured through higher-layer signaling or an SRS resource set configured through the higher-layer signaling.

In one embodiment, a cyclic redundancy check code corresponding to downlink control information (DCI) is scrambled by the first communication node according to a mask selected by the antenna group, where the indication information is sent through the DCI.

In one embodiment, the indication information includes a first slot offset parameter. The first slot offset parameter corresponds to a slot for sending an uplink signal. The uplink signal includes an aperiodic SRS.

In one embodiment, the first slot offset parameter is configured by the first communication node in the SRS resource configured through the higher-layer signaling or the SRS resource set configured through the higher-layer signaling.

In one embodiment, in the case where a plurality of first slot offset parameters are configured in the SRS resource or the SRS resource set, the first slot offset parameters are determined by the first communication node according to an SRS request domain of the DCI. The first slot offset parameters are associated with a plurality of aperiodic SRS-resource trigger parameters or code points.

In one embodiment, the indication information includes a sub-band parameter. The sub-band parameter corresponds to a sub-band for sending the uplink signal. The uplink signal includes the SRS. The indication information is used for indicating that the second communication node sends the SRS on the sub-band repeatedly or in a frequency-hopping manner.

In one embodiment, the method further includes sending a broadband SRS to the first communication node. The first communication node determines the sub-band through measuring the broadband SRS.

In one embodiment, the broadband SRS is sent through part of physical resource blocks in an activated bandwidth part (BWP) by the second communication node.

In one embodiment, the indication information is sent through the DCI used for uplink scheduling or downlink scheduling. The uplink signal includes the SRS.

In one embodiment, the indication information includes a configuration parameter of the SRS. The configuration parameter includes at least one of the following: the corresponding antenna group association parameter for sending the SRS, a slot offset association parameter, the spatial relationship of a beam, a frequency domain position, or the cyclic shift of an SRS sequence.

In one embodiment, in the case of using the DCI to trigger the aperiodic SRS, the indication information is used for indicating that the second communication node sends the aperiodic SRS resource set on a first target slot. The first target slot is a (k+1)th available slot or valid slot after a slot corresponding to the first slot offset parameter. k is 0 or a positive integer.

In one embodiment, in the case of using the DCI to trigger the aperiodic SRS, the indication information is used for indicating that the second communication node sends the aperiodic SRS resource set on the first target slot. The first target slot is a (k+1)th available slot or valid slot counted from a reference slot. Alternatively, the first target slot is a (k+1)th available slot or valid slot among N slots counted from the reference slot. k is 0 or a positive integer. N is a positive integer within a first preset range or is equal to a product of E and (k+1). E is a positive integer within a second preset range. The reference slot is a slot corresponding to a value obtained by rounding down a product of n and a first parameter. n corresponds to a slot for triggering the aperiodic SRS. The first parameter is a ratio of 2 to the $\mu_{SRS}$th power to 2 to the $\mu_{PDCCH}$th power. $\mu_{SRS}$ is the subcarrier spacing configuration of the triggered SRS. $\mu_{PDCCH}$ is the subcarrier spacing configuration of a physical downlink control channel (PDCCH) carrying a triggering command. The spacing between a first symbol of an SRS resource of the first target slot and a last symbol of the PDCCH triggering the aperiodic SRS is greater than or equal to a preset value.

In one embodiment, k is determined through at least one of the following manners: k is configured through radio resource control (RRC) signaling, k is equal to the first slot offset parameter, k is configured through the RRC signaling and corresponds to one SRS trigger state or one antenna group association parameter, k corresponds to a control resource set, k corresponds to the slot where the PDCCH triggering the SRS is located, or k is a preset value.

In one embodiment, in the case of using the DCI to trigger the aperiodic SRS, the indication information is used for indicating that the second communication node sends the aperiodic SRS on a second target slot. The second target slot is a first valid slot among slots configured in the SRS resource or SRS resource set of the second communication node. Alternatively, the second target slot is a slot, among corresponding valid slots in the SRS resource or SRS resource set of the second communication node, having the smallest slot offset against the slot where the PDCCH triggering the aperiodic SRS is located.

In one embodiment, in the case of using the DCI to trigger the aperiodic SRS, or in the case where the SRS resource or at least one SRS resource in the SRS resource set configured for the slot corresponding to the first slot offset parameter or configured for the slot where the PDCCH triggering the aperiodic SRS is located is on at least one downlink symbol, the indication information is used for indicating that the second communication node sends the aperiodic SRS on a third target slot. The third target slot is a first valid slot among N slots after the slot where the PDCCH triggering the aperiodic SRS is located. Alternatively, the third target slot is a first valid slot among N slots after the slot corresponding to the first slot offset parameter. N is a positive integer within the first preset range.

In one embodiment, in the case where the indication information is used for indicating that the second communication node sends the uplink signal and where the indication information does not include the first slot offset parameter, the indication information is used for indicating that the second communication node sends the aperiodic SRS on the third target slot. The third target slot is the first valid slot among the N slots after the slot where the PDCCH triggering the aperiodic SRS is located. Alternatively, the third target slot is the first valid slot among the N slots after the slot corresponding to the first slot offset parameter. N is a positive integer within the first preset range.

In one embodiment, in the case where no valid slot exits among the N slots, the indication information is used for indicating that the second communication node sends the aperiodic SRS on the slot corresponding to the first slot offset parameter or on part of symbols in a last slot among the N slots.

In one embodiment, a valid slot includes at least one of the following: an uplink slot, a special slot, or a flexible slot which is available or valid; an uplink slot, a special slot, or a flexible slot that is used for sending the SRS resource or at least one SRS resource in the SRS resource set; an uplink slot, a special slot, or a flexible slot that is used for sending the SRS resource or all SRS resources in the SRS resource set; an uplink slot that is used for sending the SRS resource or at least one SRS resource in the SRS resource set and does not conflict with an uplink slot that is used for sending another uplink signal, or a special slot that is used for sending the SRS resource or at least one SRS resource in the SRS resource set and does not conflict with a special slot that is used for sending another uplink signal, or a flexible slot that is used for sending the SRS resource or at least one SRS resource in the SRS resource set and does not conflict with a flexible slot that is used for sending another uplink signal; or a slot satisfying that there are at least one uplink symbol used for sending the SRS resource or sending all the SRS resources in the SRS resource set and satisfying the minimum timing requirement between the PDCCH triggering the aperiodic SRS and the sending of all the SRS resources in the SRS resource set.

In one embodiment, the indication information includes a second slot offset parameter. The second slot offset parameter corresponds to a slot for receiving a downlink signal. The downlink signal includes a channel state information-reference signal (CSI-RS). The indication information is used for indicating that the second communication node receives an aperiodic CSI-RS.

In one embodiment, the second slot offset parameter is configured by the first communication node in the CSI-RS resource configured through the higher-layer signaling or the CSI-RS resource set configured through the higher-layer signaling. In one embodiment, as for the aperiodic CSI-RS resource set triggered by the DCI, the indication information is used for indicating that the first communication node sends the aperiodic CSI-RS resource set on a fourth target slot. The fourth target slot is an (h+1)th available slot or valid slot counted from a slot for triggering the aperiodic CSI-RS resource set. Alternatively, the fourth target slot is an (h+1)th available slot or valid slot among M slots counted from the slot for triggering the aperiodic CSI-RS resource set. h is 0 or a positive integer. M is a positive integer within the first preset range or is equal to a product of F and (h+1). F is a positive integer within the second preset range.

In one embodiment, h is determined through at least one of the following manners: h is configured through the RRC signaling, h is equal to the second slot offset parameter, h is configured through the RRC signaling and corresponds to one CSI-RS trigger state, h corresponds to the control resource set, or h corresponds to the slot where the PDCCH triggering the CSI-RS is located.

In one embodiment, as for the aperiodic CSI-RS resource set triggered by the DCI, the indication information is used for indicating that the first communication node sends the aperiodic CSI-RS on a fifth target slot. The fifth target slot is a first valid slot among slots configured in the CSI-RS resource set of the second communication node. Alternatively, the fifth target slot is a slot having the smallest slot offset among valid slots in the CSI-RS resource set of the second communication node.

In one embodiment, as for the aperiodic CSI-RS resource set triggered by the DCI, the indication information is used for indicating that the first communication node sends the aperiodic CSI-RS on the fifth target slot. The fifth target slot is a first valid slot among M slots after the slot where the PDCCH triggering the aperiodic CSI-RS is located. Alternatively, the fifth target slot is a first valid slot among M slots after a slot corresponding to the second slot offset parameter. M is a positive integer within the second preset range.

In one embodiment, in the case where the indication information is used for indicating that the second communication node receives the downlink signal and wherein the indication information does not include the second slot offset parameter, the indication information is used for indicating that the first communication node sends the aperiodic CSI-RS resource set on the fifth target slot. The fifth target slot is the first valid slot among the M slots after the slot where the PDCCH triggering the aperiodic CSI-RS is located. Alternatively, the fifth target slot is the first valid slot among the M slots after the slot corresponding to the second slot offset parameter. M is a positive integer within the second preset range.

In one embodiment, in the case where no valid slot exits among the M slots, the indication information is used for indicating that the first communication node sends the aperiodic CSI-RS on the slot corresponding to the second slot offset parameter or on part of symbols in a last slot among the M slots.

In one embodiment, a valid slot includes at least one of the following: a downlink slot, a special slot, or a flexible slot which is available or valid; an uplink slot, a special slot, or a flexible slot that is used for sending the CSI-RS resource or at least one CSI-RS resource in the CSI-RS resource set; an uplink slot, a special slot, or a flexible slot that is used for sending the CSI-RS resource or all CSI-RS resources in the CSI-RS resource set; an uplink slot that is used for sending a CSI-RS resource or at least one CSI-RS resource in the CSI-RS resource set and does not conflict with an uplink slot that is used for sending another uplink signal, a special slot that is used for sending a CSI-RS resource or at least one CSI-RS resource in the CSI-RS resource set and does not conflict with a special slot that is used for sending another uplink signal, or a flexible slot that is used for sending a CSI-RS resource or at least one CSI-RS resource in the CSI-RS resource set and does not conflict with a flexible slot that is used for sending another uplink signal; or a slot satisfying that there is at least one downlink symbol used for sending the CSI-RS resource or sending all the CSI-RS resources in the CSI-RS resource set and satisfying the minimum timing requirement between the PDCCH triggering the aperiodic CSI-RS and the sending of all the CSI-RS resources in the CSI-RS resource set.

In one embodiment, the method further includes that, in the case where at least one resource in the triggered aperiodic SRS resource set or aperiodic CSI-RS resource set conflicts with another to-be-transmitted signal, removing a symbol in the conflict in the resource set, postponing the sending of the aperiodic SRS or aperiodic CSI-RS, or removing the to-be-transmitted signal in the conflict and preferentially transmitting the aperiodic SRS or aperiodic CSI-RS.

In one embodiment, the indication information is further used for indicating that, in the case where the sending of at least two aperiodic SRSs or at least two aperiodic CSI-RSs is triggered by the same DCI or different types of DCI, or in the case where a plurality of triggered SRS resources or SRS resource sets conflict with each other or a plurality of triggered CSI-RS resources or CSI-RS resource sets conflict with each other, only an aperiodic SRS resource or SRS resource set triggered by the latest DCI or only an aperiodic CSI-RS resource or CSI-RS resource set triggered by the latest DCI is transmitted, or only an aperiodic SRS resource or SRS resource set with the smallest or largest resource set identity or only an aperiodic CSI-RS resource or CSI-RS resource set with the smallest or largest resource set identity is transmitted.

In one embodiment, the indication information includes a third slot offset parameter. The third slot offset parameter corresponds to a slot for sending a downlink signal. The downlink signal includes a PDSCH. The indication information is used for indicating that the second communication node receives the PDSCH.

In one embodiment, the first communication node is further used for configuring at least one information element through the RRC signaling. The at least one information element is used for configuring the time-domain relationship between the PDCCH and the PDSCH. The at least one information element corresponds to at least one slot offset parameter respectively. In the case where at least two information elements are included, it is determined through DCI signaling that a slot offset parameter corresponding to one information element is the third slot offset parameter.

In one embodiment, in the case where the DCI triggers the sending of the PDSCH, the indication information is used for indicating that the second communication node receives the PDSCH on a sixth target slot. The sixth target slot is an (r+1)th available or valid downlink slot or special slot after the slot where the PDCCH is located or after a slot corresponding to a sixth slot offset parameter. r is 0 or a positive integer.

In one embodiment, r is determined through at least one of the following manners: r is configured through the RRC signaling, r is equal to the third slot offset parameter, r is configured through the RRC signaling and corresponds to one CSI-RS trigger state, r corresponds to the control resource set, r corresponds to the slot where the PDCCH scheduling the PDSCH is located, or r is a preset value.

In one embodiment, the indication information includes a fourth slot offset parameter. The fourth slot offset parameter corresponds to a slot for sending an uplink signal. The uplink signal includes a PUSCH. The indication information is used for indicating that the second communication node sends the PUSCH.

In one embodiment, the first communication node is further used for configuring at least one information element through the RRC signaling. The at least one information element is used for configuring the time-domain relationship between the PDCCH and the PUSCH. The at least one information element corresponds to at least one slot offset parameter respectively. In the case where at least two information elements are included, it is determined through the DCI signaling that a slot offset parameter corresponding to one information element is the fourth slot offset parameter.

In one embodiment, in the case where the DCI triggers the sending of the PUSCH, the indication information is used for indicating that the second communication node receives the PUSCH on a seventh target slot. The seventh target slot is a (y+1)th available or valid downlink slot or special slot after the slot where the PDCCH is located or after a slot corresponding to a fourth slot offset association parameter. y is 0 or a positive integer.

In one embodiment, y is determined through at least one of the following manners: y is configured through the RRC signaling, y is equal to the fourth slot offset parameter, y is configured through the RRC signaling and corresponds to one CSI-RS trigger state, y corresponds to the control resource set, or y corresponds to the slot where the PDCCH scheduling the PDSCH is located.

In one embodiment, the indication information includes a fifth slot offset parameter. The fifth slot offset parameter corresponds to a slot for sending an uplink signal. The uplink signal includes a PUCCH associated with acknowledgment and non-acknowledgment information. The indication information is used for indicating that the second communication node sends the PUCCH associated with acknowledgment and non-acknowledgment information.

In one embodiment, the first communication node is further used for configuring at least one preset parameter through the RRC signaling. The at least one preset parameter is used for configuring the time-domain relationship between the PDSCH and the PUCCH.

In one embodiment, the indication information is used for indicating that the second communication node sends the PUCCH on an eighth target slot. The eighth target slot is an (x+1)th available or valid downlink slot or special slot after the slot where the PDSCH is located or after a slot corresponding to a fifth slot offset association parameter. x is 0 or a positive integer.

In one embodiment, x is determined through at least one of the following manners: x is configured through the RRC signaling, x is equal to the fifth slot offset parameter, x is configured through the RRC signaling and corresponds to one CSI-RS trigger state, x corresponds to the control resource set, or x corresponds to the slot where the PDCCH scheduling the PDSCH is located.

Embodiments of the present application further provide a transmission apparatus. FIG. 4 is a diagram illustrating the structure of a transmission apparatus according to one embodiment. As shown in FIG. 4, the transmission apparatus includes a sending module 310 and a first transmission module 320.

The sending module 310 is configured to send indication information. The indication information is used for indicating that a second communication node sends an uplink signal or indicating that the second communication node receives a downlink signal.

The first transmission module 320 is configured to perform signal transmission with the second communication node according to the indication information.

The transmission apparatus in this embodiment, through sending the indication information, indicates that the second communication node sends the uplink signal or receives the downlink signal. The apparatus is suitable for various signal transmission situations, improving the flexibility of signal transmission between a first communication node and the second communication node and guaranteeing the reliability of transmission.

In one embodiment, the indication information includes an antenna group association parameter. The antenna group association parameter corresponds to an antenna group for sending the uplink signal.

In one embodiment, at least one of the following is included: The antenna group association parameter is configured in a sounding reference signal (SRS) resource configured through higher-layer signaling or an SRS resource set configured through the higher-layer signaling; or a cyclic redundancy check code corresponding to downlink control information (DCI) is scrambled according to a mask selected by the antenna group, where the indication information is sent through the DCI.

In one embodiment, the indication information includes a first slot offset parameter. The first slot offset parameter corresponds to a slot for sending an uplink signal. The uplink signal includes an aperiodic SRS.

In one embodiment, the method further includes configuring the first slot offset parameter in the SRS resource configured through the higher-layer signaling or the SRS resource set configured through the higher-layer signaling.

In one embodiment, the method further includes that in the case where a plurality of first slot offset parameters are configured in the SRS resource or the SRS resource set, the first slot offset parameters are determined according to an SRS request domain of the DCI. The first slot offset parameters are associated with a plurality of aperiodic SRS-resource trigger parameters or code points.

In one embodiment, the indication information includes a sub-band parameter. The sub-band parameter corresponds to a sub-band for sending the uplink signal. The uplink signal includes the SRS. The indication information is used for indicating that the second communication node sends the SRS on the sub-band repeatedly or in a frequency-hopping manner.

In one embodiment, the method further includes that a broadband SRS sent by the second communication node is received and that the sub-band is determined through measuring the broadband SRS.

In one embodiment, the broadband SRS is sent through part of physical resource blocks in an activated bandwidth part (BWP) by the second communication node.

In one embodiment, the indication information is sent through the DCI used for uplink scheduling or downlink scheduling. The uplink signal includes the SRS.

In one embodiment, the indication information includes a configuration parameter of the SRS. The configuration parameter includes at least one of the following: the corresponding antenna group association parameter for sending the SRS, a slot offset association parameter, the spatial relationship of a beam, a frequency domain position, or the cyclic shift of an SRS sequence.

In one embodiment, in the case of using the DCI to trigger the aperiodic SRS, the indication information is used for indicating that the second communication node sends the aperiodic SRS resource set on a first target slot. The first target slot is a (k+1)th available slot or valid slot after a slot corresponding to the first slot offset parameter. k is 0 or a positive integer.

In one embodiment, in the case of using the DCI to trigger the aperiodic SRS, the indication information is used for indicating that the second communication node sends the aperiodic SRS resource set on the first target slot. The first target slot is a (k+1)th available slot or valid slot counted from a reference slot. Alternatively, the first target slot is a (k+1)th available slot or valid slot among N slots counted from the reference slot. k is 0 or a positive integer. N is a positive integer within a first preset range or is equal to a product of E and (k+1). E is a positive integer within a second preset range. The reference slot is a slot corresponding to a value obtained by rounding down a product of n and a first parameter. n corresponds to a slot for triggering the aperiodic SRS. The first parameter is a ratio of 2 to the $\mu_{SRS}$th power to 2 to the $\mu_{PDCCH}$th power. $\mu_{SRS}$ is the subcarrier spacing configuration of the triggered SRS. $\mu_{PDCCH}$ is the subcarrier spacing configuration of a physical downlink control channel (PDCCH) carrying a triggering command. The spacing between a first symbol of an SRS resource of the first target slot and a last symbol of the PDCCH triggering the aperiodic SRS is greater than or equal to a preset value.

In one embodiment, k is determined through at least one of the following manners: k is configured through radio resource control (RRC) signaling, k is equal to the first slot offset parameter, k is configured through the RRC signaling and corresponds to one SRS trigger state or one antenna group association parameter, k corresponds to a control resource set, k corresponds to the slot where the PDCCH triggering the SRS is located, or k is a preset value.

In one embodiment, in the case of using the DCI to trigger the aperiodic SRS, the indication information is used for indicating that the second communication node sends the aperiodic SRS on a second target slot. The second target slot is a first valid slot among slots configured in the SRS resource or SRS resource set of the second communication node. Alternatively, the second target slot is a slot, among corresponding valid slots in the SRS resource or SRS resource set of the second communication node, having the smallest slot offset against the slot where the PDCCH triggering the aperiodic SRS is located.

In one embodiment, in the case of using the DCI to trigger the aperiodic SRS, or in the case where the SRS resource or at least one SRS resource in the SRS resource set configured for the slot corresponding to the first slot offset parameter or configured for the slot where the PDCCH triggering the aperiodic SRS is located is on at least one downlink symbol, the indication information is used for indicating that the second communication node sends the aperiodic SRS on a third target slot. The third target slot is a first valid slot among N slots after the slot where the PDCCH triggering the aperiodic SRS is located. Alternatively, the third target slot is a first valid slot among N slots after the slot corresponding to the first slot offset parameter. N is a positive integer within the first preset range.

In one embodiment, in the case where the indication information is used for indicating that the second communication node sends the uplink signal and where the indication information does not include the first slot offset parameter, the indication information is used for indicating that the second communication node sends the aperiodic SRS on the third target slot. The third target slot is the first valid slot among the N slots after the slot where the PDCCH triggering the aperiodic SRS is located. Alternatively, the third target slot is the first valid slot among the N slots after the slot corresponding to the first slot offset parameter. N is a positive integer within the first preset range.

In one embodiment, in the case where no valid slot exits among the N slots, the indication information is used for indicating that the second communication node sends the aperiodic SRS on the slot corresponding to the first slot offset parameter or on part of symbols in a last slot among the N slots.

In one embodiment, a valid slot includes at least one of the following: an uplink slot, a special slot, or a flexible slot which is available or valid; an uplink slot, a special slot, or a flexible slot that is used for sending an SRS resource or at least one SRS resource in the SRS resource set; an uplink slot, a special slot, or a flexible slot that is used for sending the SRS resource or all SRS resources in the SRS resource set; an uplink slot that is used for sending the SRS resource or at least one SRS resource in the SRS resource set and does not conflict with an uplink slot that is used for sending another uplink signal, or a special slot that is used for sending the SRS resource or at least one SRS resource in the SRS resource set and does not conflict with a special slot that is used for sending another uplink signal, or a flexible slot that is used for sending the SRS resource or at least one SRS resource in the SRS resource set and does not conflict with a flexible slot that is used for sending another uplink signal; or a slot satisfying there are at least one uplink symbol used for sending the SRS resource or sending all the SRS resources in the SRS resource set and satisfying the minimum timing requirement between the PDCCH triggering the aperiodic SRS and the sending of all the SRS resources in the SRS resource set.

In one embodiment, the indication information includes a second slot offset parameter. The second slot offset parameter corresponds to a slot for receiving a downlink signal. The downlink signal includes a channel state information-reference signal (CSI-RS). The indication information is used for indicating that the second communication node receives an aperiodic CSI-RS.

In one embodiment, the method further includes configuring the second slot offset parameter in a CSI-RS resource configured through the higher-layer signaling or a CSI-RS resource set configured through the higher-layer signaling.

In one embodiment, as for the aperiodic CSI-RS resource set triggered by the DCI, the indication information is used for indicating that the first communication node sends the aperiodic CSI-RS resource set on a fourth target slot. The fourth target slot is an (h+1)th available slot or valid slot counted from a slot for triggering the aperiodic CSI-RS resource set. Alternatively, the fourth target slot is an (h+1)th available slot or valid slot among M slots counted from the slot for triggering the aperiodic CSI-RS resource set. h is 0 or a positive integer. M is a positive integer within the first preset range or is equal to a product of F and (h+1). F is a positive integer within the second preset range.

In one embodiment, h is determined through at least one of the following manners: h is configured through the RRC signaling, h is equal to the second slot offset parameter, h is configured through the RRC signaling and corresponds to one CSI-RS trigger state, h corresponds to the control resource set, h corresponds to the slot where the PDCCH triggering the CSI-RS is located, or h is a preset value.

In one embodiment, as for the aperiodic CSI-RS resource set triggered by the DCI, the indication information is used for indicating that the first communication node sends the aperiodic CSI-RS on a fifth target slot. The fifth target slot is a first valid slot among slots configured in the CSI-RS resource set of the second communication node. Alternatively, the fifth target slot is a slot having the smallest slot offset among valid slots in the CSI-RS resource set of the second communication node.

In one embodiment, as for the aperiodic CSI-RS resource set triggered by the DCI, the indication information is used for indicating that the first communication node sends the aperiodic CSI-RS on the fifth target slot. The fifth target slot is a first valid slot among M slots after the slot where the PDCCH triggering the aperiodic CSI-RS is located. Alternatively, the fifth target slot is a first slot among M slots after the slot corresponding to a second slot offset parameter. M is a positive integer within the second preset range.

In one embodiment, in the case where the indication information is used for indicating that the second communication node receives the downlink signal and wherein the indication information does not include the second slot offset parameter, the indication information is used for indicating that the first communication node sends the aperiodic CSI-RS resource set on the fifth target slot. The fifth target slot is the first valid slot among the M slots after the slot where the PDCCH triggering the aperiodic CSI-RS is located. Alternatively, the fifth target slot is the first valid slot among the M slots after the slot corresponding to the second slot offset parameter. M is a positive integer within the second preset range.

In one embodiment, in the case where no valid slot exits among the M slots, the indication information is used for indicating that the first communication node sends the aperiodic CSI-RS on the slot corresponding to the second slot offset parameter or on part of symbols in a last slot among the M slots.

In one embodiment, a valid slot includes at least one of the following: a downlink slot, a special slot, or a flexible slot which is available or valid; an uplink slot, a special slot, or a flexible slot that is used for sending a CSI-RS resource or at least one CSI-RS resource in the CSI-RS resource set; an uplink slot, a special slot, or a flexible slot that is used for sending a CSI-RS resource or all CSI-RS resources in the CSI-RS resource set; an uplink slot that is used for sending a CSI-RS resource or at least one CSI-RS resource in the CSI-RS resource set and does not conflict with an uplink slot that is used for sending another uplink signal, a special slot that is used for sending a CSI-RS resource or at least one CSI-RS resource in the CSI-RS resource set and does not conflict with a special slot that is used for sending another uplink signal, or a flexible slot that is used for sending a CSI-RS resource or at least one CSI-RS resource in the CSI-RS resource set and does not conflict with a flexible slot that is used for sending another uplink signal; or a slot satisfying that there is at least one downlink symbol used for sending the CSI-RS resource or sending all the CSI-RS resources in the CSI-RS resource set and satisfying the minimum timing requirement between the PDCCH triggering the aperiodic CSI-RS and the sending of all the CSI-RS resources in the CSI-RS resource set.

In one embodiment, the method further includes that, in the case where at least one resource in the triggered aperiodic SRS resource set or aperiodic CSI-RS resource set conflicts with another to-be-transmitted signal, removing a symbol in the conflict in the resource set, postponing the sending of the aperiodic SRS or aperiodic CSI-RS, or removing the to-be-transmitted signal in the conflict and preferentially transmitting the aperiodic SRS or aperiodic CSI-RS.

In one embodiment, the indication information is further used for indicating that, in the case where the sending of at least two aperiodic SRSs or at least two aperiodic CSI-RSs is triggered by the same DCI or different types of DCI, or in the case where a plurality of triggered SRS resources or SRS resource sets conflict with each other or a plurality of triggered CSI-RS resources or CSI-RS resource sets conflict with each other, only an aperiodic SRS resource or SRS resource set triggered by the latest DCI or only an aperiodic CSI-RS resource or CSI-RS resource set triggered by the latest DCI is transmitted, or only an aperiodic SRS resource or SRS resource set with the smallest or largest resource set identity or only an aperiodic CSI-RS resource or CSI-RS resource set with the smallest or largest resource set identity is transmitted.

In one embodiment, the indication information includes a third slot offset parameter. The third slot offset parameter corresponds to a slot for sending a downlink signal. The downlink signal includes a PDSCH. The indication information is used for indicating that the second communication node receives the PDSCH.

In one embodiment, the method further includes configuring at least one information element through the RRC signaling. The at least one information element is used for configuring the time-domain relationship between the PDCCH and the PDSCH. The at least one information element corresponds to at least one slot offset parameter respectively. In the case where at least two information elements are included, it is determined through DCI signaling that a slot offset parameter corresponding to one information element is the third slot offset parameter.

In one embodiment, in the case where the DCI triggers the sending of the PDSCH, the indication information is used for indicating that the second communication node receives the PDSCH on a sixth target slot. The sixth target slot is an (r+1)th available or valid downlink slot or special slot after the slot where the PDCCH is located or after a slot corresponding to a sixth slot offset parameter. r is 0 or a positive integer.

In one embodiment, r is determined through at least one of the following manners: r is configured through the RRC signaling, r is equal to the third slot offset parameter, r is configured through the RRC signaling and corresponds to one CSI-RS trigger state, r corresponds to the control resource set, r correspond to the slot where the PDCCH scheduling the PDSCH is located, or r is a preset value.

In one embodiment, the indication information includes a fourth slot offset parameter. The fourth slot offset parameter corresponds to a slot for sending an uplink signal. The uplink signal includes a PUSCH. The indication information is used for indicating that the second communication node sends the PUSCH.

In one embodiment, the method further includes configuring at least one information element through the RRC signaling. The at least one information element is used for configuring the time-domain relationship between the PDCCH and the PUSCH. The at least one information element corresponds to at least one slot offset parameter respectively. In the case where at least two information elements are included, it is determined through the DCI signaling that a slot offset parameter corresponding to one information element is the fourth slot offset parameter.

In one embodiment, in the case where the DCI triggers the sending of the PUSCH, the indication information is used for indicating that the second communication node receives the PUSCH on a seventh target slot. The seventh target slot is a (y+1)th available or valid downlink slot or special slot after the slot where the PDCCH is located or after a slot corresponding to a fourth slot offset association parameter. y is 0 or a positive integer.

In one embodiment, y is determined through at least one of the following manners: y is configured through the RRC signaling, y is equal to the fourth slot offset parameter, y is configured through the RRC signaling and corresponds to one CSI-RS trigger state, y corresponds to the control resource set, y corresponds to the slot where the PDCCH scheduling the PDSCH is located, or y is a preset value.

In one embodiment, the indication information includes a fifth slot offset parameter. The fifth slot offset parameter corresponds to a slot for sending an uplink signal. The uplink signal includes a PUCCH associated with acknowledgment and non-acknowledgment information. The indication information is used for indicating that the second communication node sends the PUCCH associated with acknowledgment and non-acknowledgment information.

In one embodiment, the method further includes configuring at least one preset parameter through the RRC signaling. The at least one preset parameter is used for configuring the time-domain relationship between the PDSCH and the PUCCH.

In one embodiment, the indication information is used for indicating that the second communication node sends the PUCCH on an eighth target slot. The eighth target slot is an (x+1)th available or valid downlink slot or special slot after the slot where the PDSCH is located or after a slot corresponding to a fifth slot offset association parameter. x is 0 or a positive integer.

In one embodiment, x is determined through at least one of the following manners: x is configured through the RRC signaling, x is equal to the fifth slot offset parameter, x is configured through the RRC signaling and corresponds to one CSI-RS trigger state, x corresponds to the control resource set, x corresponds to the slot where the PDCCH scheduling the PDSCH is located, or x is a preset value.

The transmission apparatus provided in this embodiment and the transmission method provided in the preceding embodiments belong to the same concept. For technical details not described in detail in this embodiment, reference may be made to any one of the preceding embodiments.

Embodiments of the present application further provide a transmission apparatus. FIG. 5 is a diagram illustrating the structure of another transmission apparatus according to one embodiment. As shown in FIG. 5, the transmission apparatus includes a receiving module 410 and a second transmission module 420.

The receiving module 410 is configured to receive indication information. The indication information is used for indicating that a second communication node sends an uplink signal or indicating that the second communication node receives a downlink signal. The second transmission module 420 is configured to perform signal transmission with a first communication node according to the indication information.

The transmission apparatus in this embodiment, through receiving the indication information and according to second indication information, sends the uplink signal to the first communication node or receives the downlink signal sent by the first communication node. The apparatus is suitable for various signal transmission situations, improving the flexibility of signal transmission between the first communication node and the second communication node and guaranteeing the reliability of transmission.

In one embodiment, the indication information includes an antenna group association parameter. The antenna group association parameter corresponds to an antenna group for sending the uplink signal.

In one embodiment, the antenna group association parameter is configured in a sounding reference signal (SRS) resource configured through higher-layer signaling or an SRS resource set configured through the higher-layer signaling.

In one embodiment, a cyclic redundancy check code corresponding to downlink control information (DCI) is scrambled by the first communication node according to a mask selected by the antenna group, where the indication information is sent through the DCI.

In one embodiment, the indication information includes a first slot offset parameter. The first slot offset parameter corresponds to a slot for sending an uplink signal. The uplink signal includes an aperiodic SRS.

In one embodiment, the first slot offset parameter is configured by the first communication node in the SRS resource configured through the higher-layer signaling or the SRS resource set configured through the higher-layer signaling.

In one embodiment, in the case where a plurality of first slot offset parameters are configured in the SRS resource or the SRS resource set, the first slot offset parameters are determined by the first communication node according to an SRS request domain of the DCI. The first slot offset parameters are associated with a plurality of aperiodic SRS-resource trigger parameters or code points.

In one embodiment, the indication information includes a sub-band parameter. The sub-band parameter corresponds to a sub-band for sending the uplink signal. The uplink signal includes the SRS. The indication information is used for indicating that the second communication node sends the SRS on the sub-band repeatedly or in a frequency-hopping manner.

In one embodiment, the method further includes sending a broadband SRS to the first communication node. The first communication node determines the sub-band through measuring the broadband SRS.

In one embodiment, the broadband SRS is sent through part of physical resource blocks in an activated bandwidth part (BWP) by the second communication node.

In one embodiment, the indication information is sent through the DCI used for uplink scheduling or downlink scheduling. The uplink signal includes the SRS.

In one embodiment, the indication information includes a configuration parameter of the SRS. The configuration parameter includes at least one of the following: the corresponding antenna group association parameter for sending the SRS, a slot offset association parameter, the spatial relationship of a beam, a frequency domain position, or the cyclic shift of an SRS sequence.

In one embodiment, in the case of using the DCI to trigger the aperiodic SRS, the indication information is used for indicating that the second communication node sends the aperiodic SRS resource set on a first target slot. The first target slot is a (k+1)th available slot or valid slot after a slot corresponding to the first slot offset parameter. k is 0 or a positive integer.

In one embodiment, in the case of using the DCI to trigger the aperiodic SRS, the indication information is used for indicating that the second communication node sends the aperiodic SRS resource set on the first target slot. The first target slot is a (k+1)th available slot or valid slot counted from a reference slot. Alternatively, the first target slot is a (k+1)th available slot or valid slot among N slots counted from the reference slot. k is 0 or a positive integer. N is a positive integer within a first preset range or is equal to a product of E and (k+1). E is a positive integer within a second preset range. The reference slot is a slot corresponding to a value obtained by rounding down a product of n and a first parameter. n corresponds to a slot for triggering the aperiodic SRS. The first parameter is a ratio of 2 to the $\mu_{SRS}$th power to 2 to the $\mu_{PDCCH}$ th power. $\mu_{SRS}$ is the subcarrier spacing configuration of the triggered SRS. $\mu_{PDCCH}$ is the subcarrier spacing configuration of a physical downlink control channel (PDCCH) carrying a triggering command. The spacing between a first symbol of an SRS resource of the first target slot and a last symbol of the PDCCH triggering the aperiodic SRS is greater than or equal to a preset value.

In one embodiment, k is determined through at least one of the following manners: k is configured through radio resource control (RRC) signaling, k is equal to the first slot offset parameter, k is configured through the RRC signaling and corresponds to one SRS trigger state or one antenna group association parameter, k corresponds to a control resource set, k corresponds to the slot where the PDCCH triggering the SRS is located, or k is a preset value.

In one embodiment, in the case of using the DCI to trigger the aperiodic SRS, the indication information is used for indicating that the second communication node sends the aperiodic SRS on a second target slot. The second target slot is a first valid slot among slots configured in the SRS resource or SRS resource set of the second communication node. Alternatively, the second target slot is a slot, among corresponding valid slots in the SRS resource or SRS resource set of the second communication node, having the smallest slot offset against the slot where the PDCCH triggering the aperiodic SRS is located.

In one embodiment, in the case of using the DCI to trigger the aperiodic SRS, or in the case where the SRS resource or at least one SRS resource in the SRS resource set configured for the slot corresponding to the first slot offset parameter or configured for the slot where the PDCCH triggering the aperiodic SRS is located is on at least one downlink symbol, the indication information is used for indicating that the second communication node sends the aperiodic SRS on a third target slot. The third target slot is a first valid slot among N slots after the slot where the PDCCH triggering the aperiodic SRS is located. Alternatively, the third target slot is a first valid slot among N slots after the slot corresponding to the first slot offset parameter. N is a positive integer within the first preset range.

In one embodiment, in the case where the indication information is used for indicating that the second communication node sends the uplink signal and where the indication information does not include the first slot offset parameter, the indication information is used for indicating that the second communication node sends the aperiodic SRS on the third target slot. The third target slot is the first valid slot among the N slots after the slot where the PDCCH triggering the aperiodic SRS is located. Alternatively, the third target slot is the first valid slot among the N slots after the slot corresponding to the first slot offset parameter. N is a positive integer within the first preset range.

In one embodiment, in the case where no valid slot exits among the N slots, the indication information is used for indicating that the second communication node sends the aperiodic SRS on the slot corresponding to the first slot offset parameter or on part of symbols in a last slot among the N slots.

In one embodiment, the valid slot includes at least one of the following: an uplink slot, a special slot, or a flexible slot which is available or valid; an uplink slot, a special slot, or a flexible slot that is used for sending an SRS resource or at least one SRS resource in the SRS resource set; an uplink slot, a special slot, or a flexible slot that is used for sending the SRS resource or all SRS resources in the SRS resource set; an uplink slot that is used for sending the SRS resource or at least one SRS resource in the SRS resource set and does not conflict with an uplink slot that is used for sending another uplink signal, or a special slot that is used for sending the SRS resource or at least one SRS resource in the SRS resource set and does not conflict with a special slot that is used for sending another uplink signal, or a flexible slot that is used for sending the SRS resource or at least one SRS resource in the SRS resource set and does not conflict with a flexible slot that is used for sending another uplink signal; or a slot satisfying that there is at least one uplink symbol used for sending the SRS resource or sending all the SRS resources in the SRS resource set and satisfying the minimum timing requirement between the PDCCH triggering the aperiodic SRS and the sending of all the SRS resources in the SRS resource set.

In one embodiment, the indication information includes a second slot offset parameter. The second slot offset parameter corresponds to a slot for receiving a downlink signal. The downlink signal includes a channel state information-reference signal (CSI-RS). The indication information is used for indicating that the second communication node receives an aperiodic CSI-RS.

In one embodiment, the second slot offset parameter is configured by the first communication node in the CSI-RS resource configured through the higher-layer signaling or the CSI-RS resource set configured through the higher-layer signaling.

In one embodiment, as for the aperiodic CSI-RS resource set triggered by the DCI, the indication information is used for indicating that the first communication node sends the aperiodic CSI-RS resource set on a fourth target slot. The fourth target slot is an (h+1)th available slot or valid slot counted from a slot for triggering the aperiodic CSI-RS resource set. Alternatively, the fourth target slot is an (h+1)th available slot or valid slot among M slots counted from the slot for triggering the aperiodic CSI-RS resource set. h is 0 or a positive integer. M is a positive integer within the first preset range or is equal to a product of F and (h+1). F is a positive integer within the second preset range.

In one embodiment, h is determined through at least one of the following manners: h is configured through the RRC signaling, h is equal to the second slot offset parameter, h is configured through the RRC signaling and corresponds to one CSI-RS trigger state, h corresponds to the control resource set, h corresponds to the slot where the PDCCH triggering the CSI-RS is located, or h is a preset value.

In one embodiment, in the case of using the DCI to trigger the aperiodic CSI-RS resource set, the indication information is used for indicating that the first communication node sends the aperiodic CSI-RS on a fifth target slot. The fifth target slot is a first valid slot among slots configured in the CSI-RS resource set of the second communication node. Alternatively, the fifth target slot is a slot having the smallest slot offset among valid slots in the CSI-RS resource set of the second communication node.

In one embodiment, as for the aperiodic CSI-RS resource set triggered by the DCI, the indication information is used for indicating that the first communication node sends the aperiodic CSI-RS on the fifth target slot. The fifth target slot is a first valid slot among M slots after the slot where the PDCCH triggering the aperiodic CSI-RS is located. Alternatively, the fifth target slot is a first slot among M slots after the slot corresponding to a second slot offset parameter. M is a positive integer within the second preset range.

In one embodiment, in the case where the indication information is used for indicating that the second communication node receives the downlink signal and wherein the indication information does not include the second slot offset parameter, the indication information is used for indicating that the first communication node sends the aperiodic CSI-RS resource set on the fifth target slot. The fifth target slot is the first valid slot among the M slots after the slot where the PDCCH triggering the aperiodic CSI-RS is located. Alternatively, the fifth target slot is the first valid slot among the M slots after the slot corresponding to the second slot offset parameter. M is a positive integer within the second preset range.

In one embodiment, in the case where no valid slot exits among the M slots, the indication information is used for indicating that the first communication node sends the aperiodic CSI-RS on the slot corresponding to the second slot offset parameter or on part of symbols in a last slot among the M slots.

In one embodiment, the valid slot includes at least one of the following: a downlink slot, a special slot, or a flexible slot which is available or valid; an uplink slot, a special slot, or a flexible slot that is used for sending a CSI-RS resource or at least one CSI-RS resource in the CSI-RS resource set; an uplink slot, a special slot, or a flexible slot that is used for sending a CSI-RS resource or all CSI-RS resources in the CSI-RS resource set; an uplink slot that is used for sending a CSI-RS resource or at least one CSI-RS resource in the CSI-RS resource set and does not conflict with an uplink slot that is used for sending another uplink signal, a special slot that is used for sending a CSI-RS resource or at least one CSI-RS resource in the CSI-RS resource set and does not conflict with a special slot that is used for sending another uplink signal, or a flexible slot that is used for sending a CSI-RS resource or at least one CSI-RS resource in the CSI-RS resource set and does not conflict with a flexible slot that is used for sending another uplink signal; or a slot satisfying that there are at least one downlink symbol used for sending the CSI-RS resource or sending all the CSI-RS resources in the CSI-RS resource set and satisfying the minimum timing requirement between the PDCCH triggering the aperiodic CSI-RS and the sending of all the CSI-RS resources in the CSI-RS resource set.

In one embodiment, the method further includes that, in the case where at least one resource in the triggered aperiodic SRS resource set or aperiodic CSI-RS resource set conflicts with another to-be-transmitted signal, removing a symbol in the conflict in the resource set, postponing the sending of the aperiodic SRS or aperiodic CSI-RS, or removing the to-be-transmitted signal in the conflict and preferentially transmitting the aperiodic SRS or aperiodic CSI-RS.

In one embodiment, the indication information is further used for indicating that, in the case where the sending of at least two aperiodic SRSs or at least two aperiodic CSI-RS s is triggered by the same DCI or different types of DCI, or in the case where a plurality of triggered SRS resources or SRS resource sets conflict with each other or a plurality of triggered CSI-RS resources or CSI-RS resource sets conflict with each other, only an aperiodic SRS resource or SRS resource set triggered by the latest DCI or only an aperiodic CSI-RS resource or CSI-RS resource set triggered by the latest DCI is transmitted, or only an aperiodic SRS resource or SRS resource set with the smallest or largest resource set identity or only an aperiodic CSI-RS resource or CSI-RS resource set with the smallest or largest resource set identity is transmitted.

In one embodiment, the indication information includes a third slot offset parameter. The third slot offset parameter corresponds to a slot for sending a downlink signal. The downlink signal includes a PDSCH. The indication information is used for indicating that the second communication node receives the PDSCH.

In one embodiment, the first communication node is further used for configuring at least one information element through the RRC signaling. The at least one information element is used for configuring the time-domain relationship between the PDCCH and the PDSCH. The at least one information element corresponds to at least one slot offset parameter respectively. In the case where at least two information elements are included, it is determined through DCI signaling that a slot offset parameter corresponding to one information element is the third slot offset parameter.

In one embodiment, in the case where the DCI triggers the sending of the PDSCH, the indication information is used for indicating that the second communication node receives the PDSCH on a sixth target slot. The sixth target slot is an (r+1)th available or valid downlink slot or special slot after the slot where the PDCCH is located or after a slot corresponding to a sixth slot offset parameter. r is 0 or a positive integer.

In one embodiment, r is determined through at least one of the following manners: r is configured through the RRC signaling, r is equal to the third slot offset parameter, r is configured through the RRC signaling and corresponds to one CSI-RS trigger state, r corresponds to the control resource set, r corresponds to the slot where the PDCCH scheduling the PDSCH is located, or r is a preset value.

In one embodiment, the indication information includes a fourth slot offset parameter. The fourth slot offset parameter corresponds to a slot for sending an uplink signal. The uplink signal includes a PUSCH. The indication information is used for indicating that the second communication node sends the PUSCH.

In one embodiment, the first communication node is further used for configuring at least one information element through the RRC signaling. The at least one information element is used for configuring the time-domain relationship between the PDCCH and the PUSCH. The at least one information element corresponds to at least one slot offset parameter respectively. In the case where at least two information elements are included, it is determined through the DCI signaling that a slot offset parameter corresponding to one information element is the fourth slot offset parameter.

In one embodiment, in the case where the DCI triggers the sending of the PUSCH, the indication information is used for indicating that the second communication node receives the PUSCH on a seventh target slot. The seventh target slot is a (y+1)th available or valid downlink slot or special slot after the slot where the PDCCH is located or after a slot corresponding to a fourth slot offset association parameter. y is 0 or a positive integer.

In one embodiment, y is determined through at least one of the following manners: y is configured through the RRC signaling, y is equal to the fourth slot offset parameter, y is configured through the RRC signaling and corresponds to one CSI-RS trigger state, y corresponds to the control resource set, y corresponds to the slot where the PDCCH scheduling the PDSCH is located, or y is a preset value.

In one embodiment, the indication information includes a fifth slot offset parameter. The fifth slot offset parameter corresponds to a slot for sending an uplink signal. The uplink signal includes a PUCCH associated with acknowledgment and non-acknowledgment information. The indication information is used for indicating that the second communication node sends the PUCCH associated with acknowledgment and non-acknowledgment information.

In one embodiment, the first communication node is further used for configuring at least one preset parameter through the RRC signaling. The at least one preset parameter is used for configuring the time-domain relationship between the PDSCH and the PUCCH.

In one embodiment, the indication information is used for indicating that the second communication node sends the PUCCH on an eighth target slot. The eighth target slot is an (x+1)th available or valid downlink slot or special slot after the slot where the PDSCH is located or after a slot corresponding to a fifth slot offset association parameter. x is 0 or a positive integer.

In one embodiment, x is determined through at least one of the following manners: x is configured through the RRC signaling, x is equal to the fifth slot offset parameter, x is configured through the RRC signaling and corresponds to one CSI-RS trigger state, x corresponds to the control resource set, x corresponds to the slot where the PDCCH scheduling the PDSCH is located, or x is a preset value.

The transmission apparatus provided in this embodiment and the transmission method provided in the preceding embodiments belong to the same concept. For technical details not described in detail in this embodiment, reference may be made to any one of the preceding embodiments.

Embodiments of the present application further provide a first communication node. The transmission method may be performed by the transmission apparatus which may be implemented by software and/or hardware and integrated into the first communication node.

Figure 6:
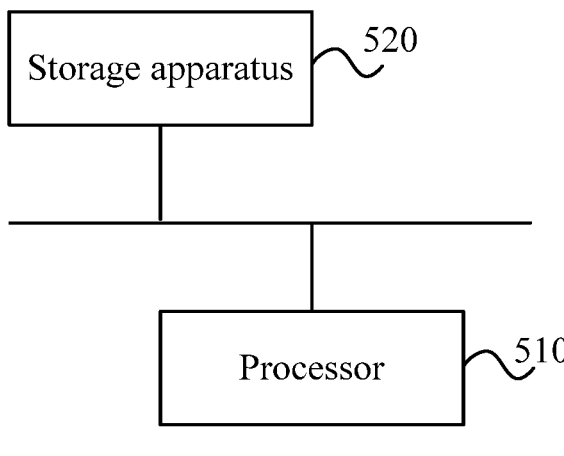
FIG. 6 is a diagram illustrating the structure of a first communication node according to one embodiment.

FIG. 6 is a diagram illustrating the structure of a first communication node according to one embodiment. As shown in FIG. 6, the first communication node provided in this embodiment includes a processor 510 and a storage apparatus 520. The first communication node may include one or more processors. One processor 510 is shown as an example in FIG. 6. The processor 510 and the storage apparatus 520 in the device may be connected via a bus or in other manners. The connection via the bus is shown as an example in FIG. 6.

One or more programs are executed by one or more processors 510 to cause the one or more processors to perform the transmission method in any one of the preceding embodiments.

The storage apparatus 520 in the first communication node, as a computer-readable storage medium, may be configured to store one or more programs which may be software programs, computer-executable programs and modules, such as program instructions/modules (for example, modules in the transmission apparatus, including a sending module 310 and a first transmission module 320, as shown in FIG. 4) corresponding to the transmission method in embodiments of the present disclosure. The processor 510 executes software programs, instructions, and modules stored in the storage apparatus 520 to perform various function applications and data processing of the first communication node, that is, to implement the transmission method in the preceding method embodiments.

The storage apparatus 520 mainly includes a program storage region and a data storage region. The program storage region may store an operating system and an application program required by at least one function. The data storage region may store data (such as indication information and an uplink signal in the preceding embodiments) created based on the use of the device. Additionally, the storage apparatus 520 may include a high-speed random-access memory and may further include a nonvolatile memory, such as at least one disk memory, a flash memory, or another nonvolatile solid-state memory. In some examples, the storage apparatus 520 may further include memories which are remotely disposed with respect to the processor 510. These remote memories may be connected to the first communication node via a network. Examples of the preceding network include, but are not limited to, the Internet, an intranet, a local area network, a mobile communication network, and a combination thereof.

Moreover, the one or more programs included in the preceding first communication node, when executed by the one or more processors 510, implement the following operations: sending indication information, where the indication information is used for indicating that a second communication node sends an uplink signal or indicating that the second communication node receives a downlink signal; and performing signal transmission with the second communication node according to the indication information.

The first communication node provided in this embodiment and the transmission method provided in the preceding embodiments belong to the same concept. For technical details not described in detail in this embodiment, reference may be made to any one of the preceding embodiments.

Embodiments of the present application further provide a second communication node. The transmission method may be performed by the transmission apparatus which may be implemented by software and/or hardware and integrated into the second communication node.

Figure 7:
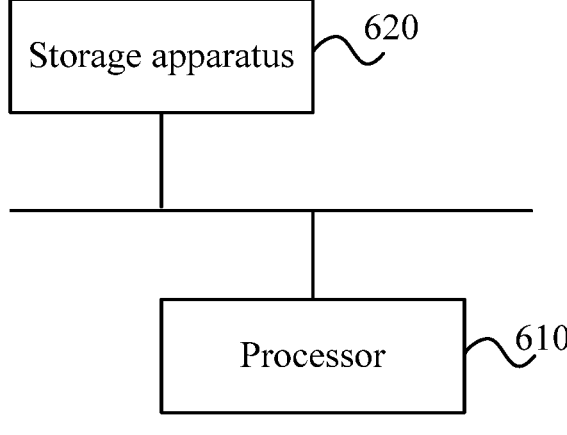
FIG. 7 is a diagram illustrating the structure of a second communication node according to one embodiment.

FIG. 7 is a diagram illustrating the structure of a second communication node according to one embodiment. As shown in FIG. 7, the second communication node provided in this embodiment includes a processor 610 and a storage apparatus 620. The second communication node may include one or more processors. One processor 610 is shown as an example in FIG. 7. The processor 610 and the storage apparatus 620 in the device may be connected via a bus or in other manners. The connection via the bus is shown as an example in FIG. 7.

One or more programs are executed by one or more processors 610 to cause the one or more processors to perform the transmission method in any one of the preceding embodiments.

The storage apparatus 620 in the second communication node, as a computer-readable storage medium, may be configured to store one or more programs which may be software programs, computer-executable programs and modules, such as program instructions/modules (for example, modules in the transmission apparatus, including a receiving module 410 and a second transmission module 420, as shown in FIG. 5) corresponding to the transmission method in embodiments of the present disclosure. The processor 610 executes software programs, instructions, and modules stored in the storage apparatus 620 to perform various function applications and data processing of the second communication node, that is, to implement the transmission method in the preceding method embodiments.

The storage apparatus 620 mainly includes a program storage region and a data storage region. The program storage region may store an operating system and an application program required by at least one function. The data storage region may store data (such as indication information and an uplink signal in the preceding embodiments) created based on the use of the device. Additionally, the storage apparatus 620 may include a high-speed random-access memory and may further include a nonvolatile memory, such as at least one disk memory, a flash memory, or another nonvolatile solid-state memory. In some examples, the storage apparatus 620 may further include memories which are remotely disposed with respect to the processor 610. These remote memories may be connected to the second communication node via a network. Examples of the preceding network include, but are not limited to, the Internet, an intranet, a local area network, a mobile communication network, and a combination thereof.

Moreover, the one or more programs included in the preceding second communication node, when executed by the one or more processors 610, implement the following operations: sending indication information, where the indication information is used for indicating that the second communication node sends an uplink signal or indicating that the second communication node receives a downlink signal; and performing signal transmission with the second communication node according to the indication information.

The second communication node provided in this embodiment and the transmission method provided in the preceding embodiments belong to the same concept. For technical details not described in detail in this embodiment, reference may be made to any one of the preceding embodiments.

Embodiments of the present application further provide a storage medium containing computer-executable instructions which, when executed by a computer processor, causes the computer processor to perform a transmission method.

From the preceding description of embodiments, it is apparent to those skilled in the art that the present application may be implemented by means of software and general-purpose hardware or may be implemented by hardware. Based on this understanding, the technical solutions provided by the present application may be embodied in the form of a software product. The software product is stored in a computer-readable storage medium, such as a computer floppy disk, a read-only memory (ROM), a random access memory (RAM), a flash, a hard disk, or an optical disk, and includes several instructions for enabling a computer device (which may be a personal computer, a server, or a network device) to perform the method of any embodiment of the present application.

The above are only exemplary embodiments of the present application and are not intended to limit the scope of the present application.

The block views of any logic flows in drawings of the present application may represent program steps, or may represent interconnected logic circuits, modules, and functions, or may represent a combination of program steps, logic circuits, modules, and functions. The computer program may be stored in a memory. The memory may be in any type suitable for the local technical environment and may be implemented using any suitable data storage technology, for example, but not limited to, a read-only memory (ROM), a random-access memory (RAM), and an optical memory apparatus and system (a digital versatile disc (DVD) or a compact disc (CD)). The computer-readable medium may include a non-transitory storage medium. The data processor may be in any type suitable for the local technical environment, for example, but not limited to, a general-purpose computer, a special-purpose computer, a microprocessor, a digital signal processing (DSP), an application-specific integrated circuit (ASIC), a field-programmable gate array (FGPA), and a processor based on a multi-core processor architecture.

What is claimed is:

1. A transmission method, comprising:
sending indication information comprising a configuration parameter of a sounding reference signal (SRS) that includes at least one of a spatial relationship of a beam, a frequency domain position, or a cyclic shift of an SRS sequence, wherein:
the indication information indicates that a second communication node sends an uplink signal on a target slot,
the uplink signal comprises an aperiodic SRS in an SRS resource set,
a physical downlink control channel (PDCCH) that triggers the aperiodic SRS is located in a slot n, a first slot is offset from slot n by a slot offset indicated in a slot offset parameter of the indication information, the target slot is a (k+1)th valid slot after the first slot, wherein the first slot corresponds to slot (n+slot offset), k is 0 or a positive integer and is indicated by the PDCCH if multiple k values are configured by RRC signaling, the valid slot includes at least one uplink symbol used for sending all SRS resources in the SRS resource set, and the valid slot is a slot that satisfies a minimum timing requirement between the slot n and the sending of all the SRS resources in the SRS resource set; and receiving the uplink signal according to the indication information.

2. The method according to claim 1, further comprising: configuring the slot offset parameter in the SRS resource set through higher-layer signaling.

3. A transmission method, comprising:

receiving indication information comprising a configuration parameter of a sounding reference signal (SRS) that includes at least one of a spatial relationship of a beam, a frequency domain position, or a cyclic shift of an SRS sequence, wherein:

the indication information indicates that a second communication node sends an uplink signal on a target slot, the uplink signal comprises an aperiodic SRS in an SRS resource set, a physical downlink control channel (PDCCH) that triggers the aperiodic SRS is located in a slot n;

a first slot is offset from slot n by a slot offset indicated in a slot offset parameter of the indication information and configured for the SRS resource set, the target slot is a (k+1)th valid slot after the first slot, wherein the first slot corresponds to slot (n+slot offset), k is 0 or a positive integer and is indicated by the PDCCH if multiple k values are configured by RRC signaling, the valid slot includes at least one uplink symbol used for sending all SRS resources in the SRS resource set, and the valid slot is a slot that satisfies a minimum timing requirement between the slot n and the sending of all the SRS resources in the SRS resource set; and sending the uplink signal according to the indication information.

4. The method according to claim 3, wherein the slot offset parameter is configured by a first communication node in the SRS resource set through higher-layer signaling.

5. A first communication node, comprising:

at least one processor; and a storage apparatus configured to store at least one program, wherein when executed by the at least one processor, the at least one program causes the at least one processor to perform steps comprising:

sending indication information comprising a configuration parameter of a sounding reference signal (SRS) that includes at least one of a spatial relationship of a beam, a frequency domain position, or a cyclic shift of an SRS sequence, wherein:

the indication information indicates that a second communication node sends an uplink signal on a target slot, the uplink signal comprises an aperiodic SRS in an SRS resource set, a physical downlink control channel (PDCCH) that triggers the aperiodic SRS is located in a slot n;

a first slot is offset from slot n by a slot offset indicated in a slot offset parameter of the indication information, the target slot is a (k+1)th valid slot after the first slot, wherein the first slot corresponds to slot (n+slot offset), k is 0 or a positive integer and is indicated by the PDCCH if multiple k values are configured by RRC signaling, the valid slot includes at least one uplink symbol used for sending all SRS resources in the SRS resource set, and the valid slot is a slot that satisfies a minimum timing requirement between the slot n and the sending of all the SRS resources in the SRS resource set; and receiving the uplink signal according to the indication information.

6. The first communication node according to claim 5, wherein when executed by the at least one processor, the at least one program further cause the at least one processor to configure the slot offset parameter in the SRS resource set through higher-layer signaling.

7. A second communication node, comprising:

at least one processor; and a storage apparatus configured to store at least one program, wherein when executed by the at least one processor, the at least one program causes the at least one processor to perform steps comprising:

receiving indication information comprising a configuration parameter of a sounding reference signal (SRS) that includes at least one of a spatial relationship of a beam, a frequency domain position, or a cyclic shift of an SRS sequence, wherein:

the indication information indicates that a second communication node sends an uplink signal on a target slot, the uplink signal comprises an aperiodic SRS in an SRS resource set, a physical downlink control channel (PDCCH) that triggers the aperiodic SRS is located in a slot n;

a first slot is offset from slot n by a slot offset indicated in a slot offset parameter of the indication information, the target slot is a (k+1)th valid slot after the first slot, wherein the first slot corresponds to slot (n+slot offset), k is 0 or a positive integer and is indicated by the PDCCH if multiple k values are configured by RRC signaling, the valid slot includes at least one uplink symbol used for sending all SRS resources in the SRS resource set, and the valid slot is a slot that satisfies a minimum timing requirement between the slot n and the sending of all the SRS resources in the SRS resource set; and sending the uplink signal according to the indication information.

8. The second communication node according to claim 7, wherein the slot offset parameter is configured by a first communication node in the SRS resource set through higher-layer signaling.

* * * * *